United States Patent
Maliverney et al.

(10) Patent No.: US 9,464,197 B2
(45) Date of Patent: Oct. 11, 2016

(54) ARTICLE WITH ANTIFOULING PROPERTIES, INTENDED FOR AQUATIC USES AND, IN PARTICULAR, FOR MARINE USES

(71) Applicant: BLUESTAR SILICONES FRANCE SAS, Lyons (FR)

(72) Inventors: Christian Maliverney, Saint Julien sur Bibost (FR); Delphine Blanc, Lyons (FR); Delphine Platel, Saint Maurice de Gourdans (FR)

(73) Assignee: BLUESTAR SILICONES FRANCE SAS, Lyons (FR)

(*) Notice: Subject to any disclaimer, the term of this patent is extended or adjusted under 35 U.S.C. 154(b) by 0 days.

(21) Appl. No.: 14/653,345

(22) PCT Filed: Dec. 19, 2013

(86) PCT No.: PCT/FR2013/000354
§ 371 (c)(1),
(2) Date: Jun. 18, 2015

(87) PCT Pub. No.: WO2014/096572
PCT Pub. Date: Jun. 26, 2014

(65) Prior Publication Data
US 2015/0329724 A1 Nov. 19, 2015

(30) Foreign Application Priority Data

Dec. 20, 2012 (FR) .................................... 12 03542

(51) Int. Cl.
| | | |
|---|---|---|
| *C09D 5/16* | (2006.01) | |
| *B01J 31/22* | (2006.01) | |
| *C09D 183/04* | (2006.01) | |
| *C08G 77/08* | (2006.01) | |
| *C08G 77/14* | (2006.01) | |
| *C08L 83/04* | (2006.01) | |

(52) U.S. Cl.
CPC .............. *C09D 5/16* (2013.01); *B01J 31/2213* (2013.01); *C08G 77/08* (2013.01); *C08G 77/14* (2013.01); *C08L 83/04* (2013.01); *C09D 5/1675* (2013.01); *C09D 5/1693* (2013.01); *C09D 183/04* (2013.01); *Y10T 428/31663* (2015.04)

(58) Field of Classification Search
None
See application file for complete search history.

(56) References Cited

U.S. PATENT DOCUMENTS

| | | | |
|---|---|---|---|
| 3,702,778 A | 11/1972 | Mueller et al. | |
| 4,025,693 A | 5/1977 | Milne | |
| 4,410,677 A * | 10/1983 | Lampe | C08K 5/098 524/265 |
| 4,515,932 A * | 5/1985 | Chung | C08G 77/08 528/12 |
| 5,055,502 A * | 10/1991 | Frances | C08G 77/18 524/780 |
| 6,245,952 B1 | 6/2001 | Mimoun | |
| 6,573,395 B2 * | 6/2003 | Mimoun | B01J 31/1805 502/162 |
| 2007/0203297 A1 * | 8/2007 | Wakabayashi | C08F 293/005 525/187 |
| 2008/0207938 A1 | 8/2008 | Prasse | |
| 2009/0092840 A1 * | 4/2009 | Schlumpf | C08G 18/10 428/423.1 |
| 2010/0324213 A1 | 12/2010 | Maliverney | |
| 2011/0046304 A1 | 2/2011 | Maliverney | |
| 2011/0206936 A1 * | 8/2011 | Maliverney | B01J 31/0251 428/447 |
| 2011/0212333 A1 * | 9/2011 | Maliverney | B08B 17/02 428/447 |
| 2011/0257286 A1 | 10/2011 | Maliverney | |
| 2011/0287268 A1 * | 11/2011 | Blanc | B01J 31/0237 428/447 |
| 2011/0305911 A1 * | 12/2011 | Blanc | A01N 55/00 428/447 |
| 2014/0343202 A1 * | 11/2014 | Dinkar | B01J 31/2234 524/141 |
| 2014/0378612 A1 * | 12/2014 | Dinkar | C08L 83/04 524/860 |

FOREIGN PATENT DOCUMENTS

| | | |
|---|---|---|
| CA | 991929 A1 | 6/1976 |
| EP | 0051930 A2 | 5/1982 |
| FR | 2083029 A | 12/1971 |
| FR | 2266733 A1 | 10/1975 |
| FR | 2375305 A1 | 7/1978 |
| FR | 2557582 A1 | 7/1985 |
| FR | 2557585 A1 | 7/1985 |
| FR | 2786497 A1 | 6/2000 |
| GB | 2118196 A | 10/1983 |
| WO | 2009133085 A1 | 11/2009 |

OTHER PUBLICATIONS

International Search Report from corresponding PCT/FR2013/000354, mailed May 8, 2015.
U.S. Appl. No. 07/847,401, filed Mar. 6, 1992.
Noll, "Chemistry and Technology of Silicones", Chapter 8, Leverkusen, Germany, 1968, pp. 386-436.

* cited by examiner

*Primary Examiner* — Robert S Loewe
(74) *Attorney, Agent, or Firm* — McBee Moore Woodward Vanik, IP LLC

(57) ABSTRACT

The invention relates to an article with antifouling properties, intended for aquatic uses and, in particular, for marine uses, and to a method for slowing down the growth of aquatic organisms on submersible or semi-subermisible structures.

18 Claims, No Drawings

ARTICLE WITH ANTIFOULING PROPERTIES, INTENDED FOR AQUATIC USES AND, IN PARTICULAR, FOR MARINE USES

CROSS REFERENCE TO RELATED APPLICATIONS

This application is a §371 National Stage Application of PCT/FR2013/000354, filed 19 Dec. 2013, which claims priority to FR 12 03542, filed 20 Dec. 2012.

BACKGROUND

1. Field of the Invention

The present invention relates to an article with antifouling properties for use in aquatic applications, in particular marine applications, and also to a process for retarding the growth of aquatic organisms on submersible or semi-submersible structures.

2. Description of Related Art

The invention relates to the field of antifouling marine paints. Antifouling marine paints are top coats for preventing the attachment of animals or plants to ship hulls. They are used for safety reasons, for maintaining the manouverability of ships, for reducing the consumption of fuel, and for combating corrosion and the emburdening of structures.

The problem of "biofouling" is a major problem resulting from the submersion of materials into marine environments. A considerable maintenance cost is involved in preventing this phenomenon.

Specifically, the formation of "biofouling" or "fouling" takes place during submersion in seawater, in which a layer of organic and mineral molecules is adsorbed onto the surface of the material extremely rapidly. This layer of adsorbed material or "biofilm" serves as a mediator for the adhesion of the bacteria present in suspension in the marine environment.

This surface colonization by marine bacteria is rapid and a stationary state is reached after a period of a few hours to a few days. Finally, other marine organisms come to colonize the surface, the adherent bacteria recruiting these other organisms. This set of live organisms connected to the surface constitutes the "biofouling" or "fouling".

The adhesion of marine fouling concerns any structure submerged in the sea: ships, pipelines, cooling towers and circuits, port structures, marine sensors, aquaculture systems, etc. Diverse and extensive damage is thereby caused. Specifically, these structures become encrusted, for example, with organisms that have a negative effect on the performance qualities of the structures.

In particular, for ship hulls, the encrustation of various marine organisms increases the friction between the ship hulls and the seawater, which reduces the speed and may lead to greater fuel consumption. Thus, the bottom of a ship that is not protected with an antifouling system may, after less than six months spent at sea, be covered with 150 kg of fouling per square meter.

To avoid this economic loss, and also to better inhibit corrosion, paints known as antifouling paints are applied to the submerged parts of structures exposed to water, the purpose of these paints being to prevent or to notably reduce the encrustation fouling of marine organisms. The principle of antifouling paints is based on the controlled release of the active substance at the interface between the surface and the seawater. The efficacy of the paint is maintained as long as the concentration of active substance released at the surface is efficient and regular. The majority of antifouling paints thus contain a biocidal product, which is usually an organometallic compound (based on tin, copper or zinc) or an organic compound (fungicide, algicide or bactericide) which prevents the adhesion of marine fouling via their toxic activity.

However, the problem associated with the use of these paints is that they release into the marine environment substances that are harmful to marine fauna and flora. Furthermore, the coatings become increasingly coarse by gradually degrading, which increases the fuel consumption and augments the hydrodynamic noise emitted by the submerged structure.

This novel difficulty has been solved by using self-cleaning antifouling paints. In addition to containing biocidal agents, these paints have, under the action of surface hydrolysis by seawater and that of erosion due to the movement of the ship, a regular and controlled loss of thickness over time. The slow erosion of the coating on contact with seawater allows the surface to be constantly renewed with biocidal agents.

The self-cleaning antifouling paints developed since the 1960s were based on tin salts. These are self-cleaning paints formulated with tributyltin (TBT) methacrylate copolymers which have a constant degree of leaching. The TBT grafted onto an acrylic binder is released slowly by hydrolysis in water. Examples of this type of paint are described in documents FR-A-2 266 733, FR-A-2 557 585, EP-A-0 051 930 and GB-A-2 118 196.

Tributyltin (TBT), which is very efficient, was thus the biocide most commonly used in antifouling paints, but this product, its degradation molecules and its metabolites have proven to be seriously and durably polluting. For these reasons, the International Maritime Organization has banned the use of tin-based antifouling paints.

The antifouling paints now used are mainly based on copper compounds and/or synthetic chemical compounds, but also based on polymers of silicone type.

For the copper-based paints, although they are less toxic than tin salts, they are virtually always formulated with a large proportion of cuprous oxide (see, for example, document EP-A-051 930 or FR-A-2 557 585), the main binder being based on special polymers generally of acrylic type. However, they are only effective against marine fauna, and, to combat the growth of algae, it is essential to add herbicides, which may place new threats on the environment.

This alternative therefore does not provide a durable solution for protecting the environment from the massive discharge of heavy ions, especially copper ions, following the intensive use of tin-free but copper-rich paints.

Another solution for preventing the fouling of the surfaces of structures in contact with seawater consists in covering these surfaces with at least one protective coating, the outer coat of the coating in contact with the water being a silicone elastomer. These coatings are prepared from paints known as "fouling-release coating" paints. The principle of these novel antifouling paints is to create a very smooth surface with a low surface energy, to which organisms have great difficulty in adhering. When such surfaces are stationary, marine organisms can be deposited thereon. However, by virtue of the suppleness and the low surface tension of the silicone-based top coat, these organisms are simply removed by the force of the movement of water or the effect of friction caused by the movement of the ship. This also means that if there is sufficient movement of water about the hull of a ship, a natural self-cleaning effect takes place.

By virtue of these properties, even ships that are less frequently at sea or in waters with less movement benefit from more spaced apart cleaning intervals. This is due to the fact that marine organisms have difficulty in adhering to the surface, which makes the cleaning easier.

These silicone-based paints forming an antifouling coating are thus very innovative:
they are totally friendly to the marine environment: no discharge of metals, and
they improve the slippage of ships, thus reducing their fuel consumption by 1% to 5% and thus their emissions of greenhouse gases.

Many patents, for example patents FR-A-2 083 029 and U.S. Pat. No. 3,702,778, describe such coatings whose final coat, known as the "top coat", is made of hot-cured or cold-cured silicone elastomer.

For example, U.S. patent application Ser. No. 07/847,401, filed on Mar. 6, 1992, discloses an antifouling system containing three components, comprising at least one coat of an epoxy primer, an adhesion primer or fixing coat (tie coat) and an antifouling coat (top coat) based on silicone elastomer. The final coat of epoxy primer is normally a thin coat that is applied to obtain a clean and fresh surface onto which the tie coat can adhere. The tie coat comprises an organopolysiloxane and a curing constituent. The antifouling coat comprises an organopolysiloxane, an alkyl silicate and a curing agent or a separate tin-based catalyst. The coat(s) of epoxy primer are applied directly onto the support. The tie coat is applied onto the coat(s) of epoxy primer. The antifouling coat of silicone coating is then applied and crosslinked on the tie coat, after partial curling of the latter.

An antifouling coat (top coat) based on silicone elastomer may also comprise fluids that improve the "antifouling" effect, in particular:
methylphenylpolysiloxane oils (U.S. Pat. No. 4,025,693),
a hydrocarbon-based liquid compound, for example a polyolefin,
a plasticizer,
a lubricant oil (FR-A-2 375 305),
liquid paraffins and waxy masses such as petrolatum (JP-A-83/013 673),
a thermoplastic polymer such as PVC,
a vinyl chloride/vinyl acetate copolymer (Kokai JP-A-79/026 826), or
cationic, anionic, nonionic or amphoteric surfactants (JP-A-85/258 271).

In order to form the silicone elastomer coating, the silicone formulations used generally involve a silicone oil, generally a reactive polydimethylsiloxane bearing hydroxyl end groups, optionally prefunctionalized with a silane so as to have alkoxy end groups, a crosslinking agent and a polycondensation catalyst, conventionally a tin salt or an alkyl titanate, a reinforcing filler and other optional additives such as packing fillers, adhesion promoters, colorants, etc.

These room-temperature vulcanizable organopolysiloxane compositions are well known and are classified into two distinct groups: one-pack compositions (RTV-1) and two-pack compositions (RTV-2). The term "RTV" is the abbreviation for "room-temperature vulcanizing".

During crosslinking, water (either provided by atmospheric humidity in the case of RTV-1, or introduced into part of the composition in the case of RTV-2) using catalysts based on tin carboxylate allows the polycondensation reaction, which leads to the formation of the elastomer network.

Generally, the one-pack compositions (RTV-1) crosslink when they are exposed to atmospheric humidity, i.e. they cannot crosslink in a confined medium. For example, one-pack silicone compositions crosslink without heating according to a mechanism of hydrolysis of reactive functions of the acetoxysilane, ketiminoxysilane, alkoxysilane, etc. type, followed by condensation reactions between formed silanol groups and other residual reactive functions. The hydrolysis is generally carried out by virtue of water vapor which diffuses into the material from the surface exposed to the atmosphere. Generally, the polycondensation reaction kinetics are extremely slow; these reactions are thus catalyzed with a suitable catalyst. As catalysts which are used, use is most often made of catalysts based on tin, titanium, an amine or compositions of these catalysts. Catalysts based on tin (cf. in particular FR-A-2 557 582) and on titanium (cf. in particular FR-A-2 786 497) are catalysts that are very effective. One-pack silicone elastomers bearing —Si(OR) end groups are occasionally referred to as alkoxy elastomers.

As regards two-pack compositions, they are sold and stored in the form of two components, a first component containing the basic polymer materials and the second component containing the catalyst. The two components are mixed at the moment of use and the mixture crosslinks in the form of a relatively hard elastomer. These two-component compositions are well known and are described, in particular, in the book by Walter Noll "Chemistry and Technology of Silicones" 1968, 2nd Edition, on pages 395 to 398. These compositions usually comprise the following ingredients:
a reactive polydiorganosiloxane with silanol groups at the end of the chain (for example an $\alpha,\omega$-di(hydroxydimethylsilyl)(polydimethylsiloxane), in the chain or at the end of the chain and in the chain,
a crosslinking agent,
a condensation catalyst, and
optionally water, often present when a dialkyltin dicarboxylate is used as catalyst (activation of this catalyst by the presence of water).

Usually, the condensation catalyst is based on an organic tin compound. Indeed, many tin-based catalysts have already been proposed as a catalyst for crosslinking these RTV-1 or RTV-2 compositions. Conventional polycondensation catalysts comprise dialkyltin compounds, especially dialkyltin dicarboxylates such as dibutyltin dilaurate and diacetate, alkyl titanate compounds such as tetrabutyl or tetraisopropyl titanate, or titanium chelates (EP-A-0 885 933, U.S. Pat. Nos. 5,519,104, 4,515,932, 4,563,498, 4,528, 353).

However, the alkyltin-based catalysts, although very effective, usually colorless, liquid and soluble in silicone oils, have the drawback of being toxic (CMR2 toxic for reproduction).

For a durable development, it thus appears necessary to develop novel antifouling paints not comprising any toxic catalyst.

For example, an important characteristic of a curable silicone composition is the working time (pot life or working time), i.e. the time for which the composition can be used after mixing without curing. This time should be long enough to allow its use, but short enough to obtain a hard coating. For example, for a coating of tie coat or top coat type, a working time of between 2 and 4 hours is generally required when the exterior temperature is between 20 and 30° C. Outside this range, one of the means for adjusting this working time is the nature of the components used such as the catalyst or the crosslinking agent.

For all these reasons, novel strategies for combating the adhesion of aquatic fouling and in particular marine fouling are now being developed.

SUMMARY

The aim of the invention is to propose an article that has antifouling properties by means of coatings obtained from antifouling paints not comprising any banned components (biocide or catalyst) and not containing any tin.

The present invention thus relates to an article with antifouling properties which is intended to be used in aquatic applications, in particular marine applications, comprising:
a) a support (1),
b) at least one adhesion-promoting coat (3) deposited on said support (1), and
c) at least one antifouling coat (4) deposited on said adhesion-promoting coat (3),
said article being characterized in that said antifouling coat (4) is obtained after deposition and curing on contact with atmospheric moisture of a composition Z comprising:
  (i) at least one organosilicon compound A' comprising at least two identical or different hydrolyzable and condensable groups, or at least two silanol functions ≡SiOH,
  (ii) at least one crosslinking agent B', and
  (iii) a catalytically effective amount of at least one polycondensation catalyst M which is a zinc complex comprising in its structure a first type of ligand that is a β-diketonate and a second type of ligand that is an amine.

DETAILED DESCRIPTION OF A PREFERRED EMBODIMENT

To achieve this objective, the Applicant has, to its credit, demonstrated, entirely surprisingly and unexpectedly, that a polycondensation catalyst M according to the invention, which is a zinc complex comprising in its structure two types of ligands, a β-diketonate and an amine, makes it possible to prepare antifouling coats or coatings that are useful as tie coat or top coat in antifouling applications. However, although having structural similarities, non-amino zinc β-diketonate complexes are much less efficient as regards the rate of crosslinking and final properties of the antifouling coat obtained after curing on contact with atmospheric moisture. The coats or coatings obtained according to the invention have noteworthy adhesion properties on the supports thus treated, while at the same time giving a very smooth treated surface, with a low surface energy, to which organisms have great difficulty in adhering.

The catalysts according to the invention are used in the silicone systems to be crosslinked in very low contents, and make it possible, depending on the content, to adapt the working times to the application while at the same time ensuring excellent hardnesses of the elastomers obtained. The catalyst according to the invention may be in the solid or liquid state. It may be incorporated alone or in a suitable solvent. When it is in solvent, a silicone oil may be added, the solvent is then evaporated so as to transfer the catalyst into a silicone medium. The mixture obtained acts as a catalyzing base.

The term "β-diketonate" means the enolate anion of a dicarbonyl compound. In the present specification, the nomenclature used for describing the β-diketonate ligands in the chemical structures of the zinc complexes according to the invention is based on the corresponding β-diketone, which is the non-anionic form of the β-diketonate ligand before its complexation with the zinc atom (preparation via the action of a base). For example, in the following notation:

<<[Zn(acac)$_2$ (n-propylamine)$_2$], with the ligand acac=pentanedione-2,4>>, it is understood that the zinc-complexing ligand is the corresponding pentanedionate anion:

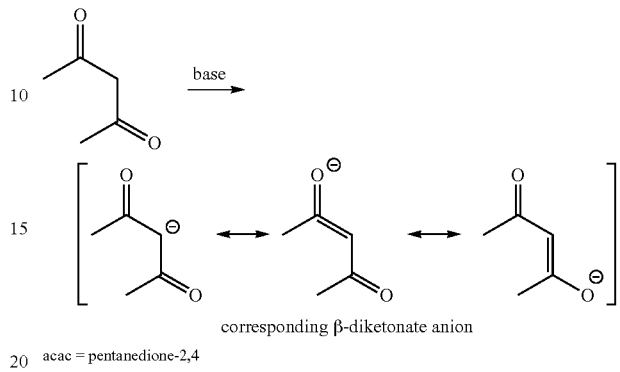

acac = pentanedione-2,4

It is also understood that the term "complex" includes in its definition any monomeric, oligomeric or similar form of said zinc complex according to the invention.

Preferentially, the polycondensation catalyst M is a zinc complex comprising in its structure at least two carboxylate ligands and at least one amine ligand, and even more preferentially, the polycondensation catalyst M is a zinc complex comprising in its structure:
at least two identical or different β-diketonate ligands, and
one or two amine ligands.

It is understood that the term "complex" includes in its definition any monomeric, oligomeric or similar form of said zinc complex according to the invention.

The inventors have, to their credit, found, entirely surprisingly and unexpectedly, that use should be made of zinc metal complexes comprising two specific types of ligands, namely β-dicarbonyl and amine ligands, to achieve crosslinking rates that are much more effective than those of zinc bis(β-diketonate) complexes, which, nevertheless, have structural similarities.

The inventors have also, to their credit, overcome the technical prejudice which maintained that, hitherto, certain complexes of metals, for instance zinc, had only mediocre activity in the polycondensation reaction of organopolysiloxanes. The definition of ligands is taken from the publication "Chimie Organométallique" by Didier Astruc, published in 2000 by EDP Sciences. See especially Chapter 1, "Les complexes monométalliques", pages 31 et seq.

The catalyst according to the invention may be in the solid or liquid state. It may be incorporated alone or in a suitable solvent. When it is in solvent, a silicone oil or any other compatible solvent such as petroleum fractions may be added, and the solvent is then evaporated so as to transfer the catalyst into a silicone medium. The mixture obtained may then serve as a "catalyzing base".

According to a preferred embodiment, the polycondensation catalyst(s) M may be obtained:
a) by reacting per 1 mol of at least one zinc complex of formula [Zn(β-diketonate)$_2$] or of a mixture of two different zinc complexes of formula [Zn (β-diketonate)$_2$] X$^1$ mol of amine or a mixture of amine with X$^1$≤2.5 molar equivalents relative to the zinc, optionally in the presence of a solvent, so as to obtain a reaction product comprising:
x mol of a zinc complex A which is a complex of formula [(Zn(β-diketonate)$_2$)$_r$(amine)]$_z$, y mol of a zinc complex B which is a complex of formula $[(Zn(\beta\text{-diketonate})_2)_r(\text{amine})_2]_{z'}$,
with x≥0, y≥0, the symbol r≥1 and preferably r=1, 2, 3 or 4, and the symbol z' is an integer greater than or equal to 1, and preferably z'=1, 2, 3 or 4,
optionally $X^3$ mol of the complex $[Zn(\beta\text{-diketonate})_2]$, and
optionally $X^4$ mol of residual unreacted amine, and b) after removal of the residual amine and optionally of the solvent, the polycondensation catalyst(s) M are recovered in the form of at least one zinc complex A, at least one zinc complex B or a mixture of zinc complex A and of zinc complex B, with optionally a residual amount of $X^3$ mol of the complex $[Zn(\beta\text{-diketonate})_2]$, and
the symbols $X^1$, $X^3$ and $X^4$ are numbers and the sum $x+y+X^3=1$.

The removal of the solvent and of the residual amine will be performed via any known technique (distillation, filtration, etc.). Care is taken in the preparation process to remove any residual amine, so as to avoid any exudation of the amine at the surface when the elastomer is prepared by curing of the composition on contact with atmospheric moisture. The removal of the solvent or of the residual amine will be performed via any known technique (distillation, filtration, etc.). It is known that structures $[Zn(\beta\text{-diketonate})_2 \text{ (amine)}]$ or $[Zn(\beta\text{-diketonate})_2(\text{amine})_2]$ may also form dimers, trimers or tetramers. Consequently, the definition of the catalyst according to the invention also includes the dimeric, trimeric or tetrameric forms of said catalyst according to the invention.

Depending on the type of polycondensation catalyst M desired (monoamino or diamino zinc bis(β-diketonate) complex, or a mixture of these species), the number of moles of amine $X^1$ will be adjusted in consequence:

$X^1 \geq 2$ molar equivalents relative to the zinc, and ≤2.5 molar equivalents relative to the zinc, so as predominantly to obtain a complex of formula $[[(Zn(\beta\text{-diketonate})_2)_r(\text{amine})_2]_{z'}$, $1 \leq X^1 < 2$ molar equivalents relative to the zinc, so as to obtain a mixture of complexes: $[(Zn(\beta\text{-diketonate})_2)_r(\text{amine})]_{z'}$ and $[(Zn(\beta\text{-diketonate})_2)_r(\text{amine})_2]_{z'}$, $X^1 < 1$ molar equivalents relative to the zinc, so as to obtain a mixture of complex $[Zn(\beta\text{-diketonate})_2(\text{amine})]$ and of unreacted complex $[Zn(\beta\text{-diketonate})_2]$, with: the symbol r≥1 and preferably r=1, 2, 3 or 4, and the symbol z' is an integer greater than or equal to 1 and preferably the symbol z'=1, 2, 3 or 4, and even more preferentially z'=1 or 2.

Preferably, the number of moles of amine $X^1$ added during the synthesis of the catalyst according to the invention will be ≤2.5 molar equivalents relative to the zinc to avoid the presence of an appreciable amount of free amine in the composition according to the invention. It is known that organic amines can migrate to the surface of the silicone elastomer, thus forming soiling that thereby degrades the properties of the elastomer, while contaminating the environment in proximity to the elastomer.

Complexes of the type $[Zn(\beta\text{-diketonate})_2]$ are for the most part commercially available or alternatively may be prepared according to a procedure described in international patent application WO 2009/106 718.

Complexes of the type zinc bis(β-diketonate) are for the most part commercially available or alternatively may be prepared easily, for example according to a procedure described in international patent application WO 2009/106 718.

Preferably, the number of moles of amine $X^1$ added during the synthesis of the catalyst according to the invention will be ≤2.5 molar equivalents relative to the zinc to avoid the presence of an appreciable amount of free amine in the medium and which would not be desirable for the stability of the composition according to the invention.

According to a particular embodiment, the invention relates to an article comprising:
a) a support (1),
b) at least one primer coat (2) deposited on said support (1) comprising at least one anticorrosion product,
c) at least one adhesion-promoting coat (3) deposited on said primer coat (2), and
d) at least one antifouling coat (4) deposited on said adhesion-promoting coat (3), said article being characterized in that said antifouling coat (4) is obtained after deposition and curing on contact with atmospheric moisture of a composition Z comprising:
  (i) at least one organosilicon compound A' comprising at least two identical or different hydrolyzable and condensable groups, or at least two silanol functions ≡SiOH,
  (ii) at least one crosslinking agent B', and
  (iii) a catalytically effective amount of at least one polycondensation catalyst M which is a zinc complex comprising in its structure a first type of ligand that is a β-diketonate and a second type of ligand that is an amine.

According to a preferred embodiment, the composition Z comprises:
(i) at least one organosilicon compound A' comprising at least two identical or different hydrolyzable and condensable groups, or at least two silanol functions ≡SiOH,
(ii) at least one crosslinking agent B', and
(iii) a catalytically effective amount of at least one polycondensation catalyst M which is a complex of formula (1') below:

$$[Zn(C^1)_{n'}(C^2)_{n''}(L^1)_{y'}(L^2)_{y''}(X)_{x'}]_{z'} \cdot (H_2O)_{x''} \quad (1')$$

in which:
the symbols $C^1$ and $C^2$ are identical or different ligands chosen from the group of β-diketonates,
the symbols n' and n'' are integers equal to 0, 1 or 2 with the condition that the sum n'+n''=2,
the symbols $L^1$ and $L^2$ are identical or different ligands chosen from the group of amines,
the symbols y' and y'' represent the number of amine ligands and are integers equal to 0, 1 or 2 with the condition that the sum y'+y''=1 or 2,
the symbol X is a ligand other than $C^1$, $C^2$, $L^1$ and $L^2$ and preferably a neutral ligand other than an amine and even more preferentially X is an $H_2O$ molecule,
the symbol x'≥0, and preferably x'=0, 1, 2, 3 or 4,
the symbol x''≥0, and preferably x''=0, 1, 2, 3 or 4, and
the symbol z' is an integer greater than or equal to 1 and preferably z'=1 or 2.

The ligand X is preferably a neutral ligand other than an amine, and the structure of which is of little importance. A person skilled in the art will use any type of precursor during the preparation of the catalyst M according to the invention such that this neutral ligand does not interfere with the reactivity of the catalyst. An example of a neutral ligand is, for example, a water molecule.

Preferably, the polycondensation catalyst M is a complex of formula (2') below:

$$[Zn(C^1)_{n'}(C^2)_{n''}(L^1)_{y'}(L^2)_{y''}]_{z'} \quad (2')$$

in which:
the symbols C¹ and C² are identical or different ligands chosen from the group of β-diketonates,
the symbols n' and n" represent the number of β-diketonate ligands and are integers equal to 0, 1 or 2 with the condition that the sum n'+n"=2,
the symbols L¹ and L² are identical or different ligands chosen from the group of amines,
the symbols y' and y" represent the number of amine ligands and are integers equal to 0, 1 or 2 with the condition that the sum y'+y"=1 or 2, and
the symbol z' is an integer greater than or equal to 1 and preferably z'=1 or 2 and even more preferentially z'=1.

According to another preferred embodiment, the polycondensation catalyst M is a complex of formula (3') below:

$$[(Zn(C^1)_2)_r(L^1)^{y'}]_{z'} \quad (3')$$

in which:
the symbol C¹ is a ligand chosen from the group of β-diketonates,
the symbol L¹ is a ligand chosen from the group of amines,
the symbol y' is a number equal to 1 or 2,
the symbol r≥1 and preferably r=1, 2, 3 or 4, and
the symbol z' is an integer greater than or equal to 1 and preferably the symbol z'=1, 2, 3 or 4, and even more preferentially z'=1 or 2.

Examples of amines that are useful as ligands L¹ or L² are, for example, the following amidines: N'-cyclohexyl-N,N-dimethylformamidine, N'-methyl-N,N-di-n-butylacetamidine, N'-octadecyl-N,N-dimethylformamidine, N'-cyclohexyl-N,N-dimethylvaleramidine, 1-methyl-2-cyclohexyliminopyrrolidine, 3-butyl-3,4,5,6-tetrahydropyrimidine, N-(hexyliminomethyl)morpholine, N-([α]-(decyliminoethyl)ethyl)pyrrolidine, N'-decyl-N,N-dimethylformamidine, N'-dodecyl-N,N-dimethylformamidine, N'-cyclohexyl-N,N-acetamidine.

Other amines that are useful as ligands are, for example, heterocyclic derivatives of imidazoline, imidazole, tetrahydropyrimidine, dihydropyrimidine, pyridine, pyrrolidine, piperidine or pyrimidine type. Use may also be made of acyclic amidines or guanidines.

Examples of imidazole ligands are the following compounds: N-(2-hydroxyethyl)imidazole, N-(3-aminopropyl)imidazole, 4-(hydroxymethyl)imidazole, 1-(tert-butoxycarbonyl)imidazole, 4-carboxyimidazole, 1-butylimidazole, 4-formylimidazole, 1-(ethoxycarbonyl)imidazole, 2-methylimidazole, 1-trimethylsilylimidazole, 1-(p-toluenesulfonyl)imidazole, 1,1'-carbonylbisimidazole and 1-(2-cyanoethyl)-2-ethyl-4-methylimidazole.

Examples of imidazoline ligands are the following compounds: 1H-imidazole-1-ethanol, 2-(8Z)-8-heptadecenyl-4,5-dihydro, 1H-imidazole-1-ethanol, 1H-imidazole-1-ethanol, 1H-imidazole, 4,5-dihydro, -2-(9Z)-9-octadecenyl, oleyl hydroxyethylimidazoline, 1H-imidazole-1-ethanol, 4,5-dihydro-2-undecyl-, 1H-imidazole-1-ethanol, 2-heptadecyl-4,5-dihydro and 1H-imidazole-1-ethanol, 2-nonyl-4,5-dihydro.

Preferably, the ligand of amine type L¹ or L² is chosen from the group consisting of: primary monoamines of alkylamine type containing in total from 1 to 40 carbon atoms for the alkyl radical, secondary monoamines of dialkylamine type containing in total from 2 to 40 carbon atoms for the alkyl radicals, tertiary monoamines of trialkylamine type containing in total from 3 to 60 carbon atoms for the alkyl radicals, alkyl diamines containing in total from 1 to 40 carbon atoms for the alkyl radicals and amino silanes, and even more preferentially the ligands L¹ and L² are chosen from the group consisting of secondary monoamines of dialkylamine type containing in total from 2 to 20 carbon atoms and primary monoamines of alkylamine type containing in total from 1 to 40 carbon atoms for the alkyl radical.

Ligands L¹ or L² that are useful according to the invention are the amines chosen from the group consisting of the following amines: N,N-dimethylethylenediamine, N,N'-dimethylethylenediamine, N,N,N'-trimethylethylenediamine, N,N'-diisopropylethylenediamine, n-butylamine, n-propylamine, n-heptylamine, n-octylamine, n-nonylamine, tert-butylamine, isopropylamine, 2-ethylhexylamine, decylamine, dodecylamine, which may be linear or branched, N-methyl-N-butylamine, N,N-dipropylamine, N,N-diisopropylamine, N-ethyl-N-butylamine, N,N-dibutylamine, N,N-dimethyl-N-butylamine, di(n-octyl)amine, N-n-propylethylenediamine, N,N,N',N'-tetramethylethylenediamine, 3-aminopropyltrimethoxysilane and 3-aminopropylmethyldiethoxysilane.

Another list of ligands that are useful according to the invention is the following list of amines:
Primary amines: N-propylamine, N-isopropylamine, N-butylamine, N-benzylamine, N-hexylamine, N-cyclohexylamine, N-n-octylamine, N-(2-ethylhexyl)amine, N-(2-phenylethyl)amine, N-(3-methoxypropyl)amine, N-nonylamine, N-isononylamine, N-decylamine, N-dodecylamine, ethylenediamine and 1,3-diaminopropane.
Secondary amines: N,N-dipropylamine, N,N-diisopropylamine, N,N-dibutylamine, N,N-dihexylamine, N,N-dicyclohexylamine, N,N-bis(2-methoxyethyl)amine, N,N-dioctylamine, N,N-bis(2-ethylhexyl)amine, N,N-diisononylamine, N,N-bis(tridecyl)amine, morpholine, piperidine, pyrrolidine, 2,2,6,6-tetramethylpiperidine, piperazine, N,N'-dimethylethylenediamine, N,N'-diethylethylenediamine and N,N'-diisopropylethylenediamine.

Examples of ligands C¹ and when the ligand C² is present are, for example, β-diketonates or enolate anions of a β-dicarbonyl compound of formula (10') below:

$$R^1COCHR^2COR^3 \quad (10')$$

in which:
R¹ and R³, independently of each other, represent a $C_1$ to $C_{30}$ hydrocarbon-based radical, a $C_6$ to $C_{30}$ hydrocarbon-based radical comprising an aromatic ring or a radical —OR⁴ with R⁴ which represents a $C_1$ to $C_{30}$ hydrocarbon-based radical,
R² is a hydrogen or a $C_1$ to $C_{30}$ hydrocarbon-based radical, with
R¹ and R² may be linked via a radical, preferably via a $C_3$ to $C_{30}$ hydrocarbon-based radical to form a ring, and
R² may be linked to R¹ or R³ via a radical, preferably via a $C_3$ to $C_{30}$ hydrocarbon-based radical to form a ring.

According to a preferred embodiment, the ligands C¹ and when the ligand C² is present are β-diketonates or enolate anions of a β-dicarbonyl compound of formula (11') below:

$$R^1COCHR^2COR^3 \quad (11')$$

in which:
R¹ and R³, independently of each other, represent a $C_1$ to $C_{30}$ hydrocarbon-based radical, a $C_6$ to $C_{30}$ hydrocarbon-based radical comprising an aromatic ring or a radical —OR⁴ with R⁴ which represents a $C_1$ to $C_{30}$ hydrocarbon-based radical, and
R² is a hydrogen or a $C_1$ to $C_{30}$ hydrocarbon-based radical.

According to a preferred embodiment, the β-diketonate ligands $C^1$ and when the ligand $C^2$ is present are β-diketonates or enolate anions of β-dicarbonyl compounds chosen from the group consisting of the following β-diketones: 2,4-hexanedione; 2,4-heptanedione; 3,5-heptanedione; 3-ethyl-2,4-pentanedione; 5-methyl-2,4-hexanedione; 2,4-octanedione; 3,5-octanedione; 5,5-dimethyl-2,4-hexanedione; 6-methyl-2,4-heptanedione; 2,2-dimethyl-3,5-nonanedione; 2,6-dimethyl-3,5-heptanedione; 2-acetylcyclohexanone (Cy-acac); 2,2,6,6-tetramethyl-3,5-heptanedione (t-Bu-acac); 1,1,1,5,5,5-hexafluoro-2,4-pentanedione (F-acac)]; benzoylacetone; dibenzoylmethane; 3-methyl-2,4-pentadione; 3-acetylpentan-2-one; 3-acetyl-2-hexanone; 3-acetyl-2-heptanone; 3-acetyl-5-methyl-2-hexanone; stearoylbenzoylmethane; octanoylbenzoylmethane; 4-t-butyl-4'-methoxydibenzoylmethane; 4,4'-dimethoxydibenzoylmethane and 4,4'-di-tert-butyldibenzoylmethane.

According to another preferred embodiment, the β-diketonate ligands $C^1$ and when the ligand $C^2$ is present are β-keto esterate anions chosen from the group consisting of anions derived from the following compounds: methyl, ethyl, n-propyl, isopropyl, n-butyl, sec-butyl, isobutyl, tert-butyl, isopentyl, n-hexyl, n-octyl, 1-methylheptyl, n-nonyl, n-decyl and n-dodecyl esters of acetylacetic acid.

Polycondensation catalysts M that are particularly advantageous are the complexes of formula (3') below:

in which:
the symbol r≥1 and preferably r=1, 2, 3 or 4,
the symbol z' is an integer greater than or equal to 1 and preferably the symbol z'=1, 2, 3 or 4 and even more preferentially z'=1 or 2,
the symbol $L^1$ is a ligand chosen from the group consisting of the following compounds:
N,N-dimethylethylenediamine, N,N'-dimethylethylenediamine, N-(n-propyl)ethylenediamine, N,N,N'-trimethylethylenediamine, N,N'-diisopropylethylenediamine, N,N-diethylethylenediamine, N,N'-diethylethylenediamine, N,N,N',N'-tetramethylethylenediamine, N-methylbutylamine, N-dibutylamine, n-propylamine, n-hexylamine, n-heptylamine, n-octylamine, n-nonylamine, n-decylamine, n-dodecylamine, tert-butylamine, isopropylamine, 2-ethylhexylamine, bis(2-ethylhexyl)amine, diisononylamine, N,N-dipropylamine, N,N-dihexylamine, N,N-diheptylamine, N,N-dioctylamine N,N-diisopropylamine, N-ethyl-N-butylamine, N,N-dimethyl-N-butylamine, 3-aminopropyltrimethoxysilane and 3-aminopropylmethyldiethoxysilane, and
the symbol $C^1$ is chosen from the group consisting of the β-diketonates or the enolate anions of the following β-dicarbonyl compounds:
2,4-pentanedione; 2,4-hexanedione; 2,4-heptanedione; 2,4-octanedione; 2,4-nonanedione; 2,4-decanedione; 2,4-undecanedione; 2,4-dodecanedione; 3,5-heptanedione; 3-ethyl-2,4-pentanedione; 5-methyl-2,4-hexanedione; 2,4-octanedione; 3,5-octanedione; 5,5-dimethyl-2,4-hexanedione; 6-methyl-2,4-heptanedione; 2,2-dimethyl-3,5-nonanedione; 2,6-dimethyl-3,5-heptanedione; 2-acetylcyclohexanone (Cy-acac); 2,2,6,6-tetramethyl-3,5-heptanedione (t-Bu-acac); 1,1,1,5,5,5-hexafluoro-2,4-pentanedione (F-acac); benzoylacetone; dibenzoylmethane; 3-methyl-2,4-pentadione; 3-acetyl-2-pentan-2-one; 3-acetyl-2-hexanone; 3-acetyl-2-heptanone; 3-acetyl-5-methyl-2-hexanone; stearoylbenzoylmethane; 4-t-butyl-4'-methoxydibenzoylmethane; 4,4'-dimethoxydibenzoylmethane, 4,4'-di-tert-butyldibenzo ylmethane; 2,2,6,6-tetramethyl-3,5-heptanedione, ethyl acetoacetate and isopropyl acetoacetate, a β-diketone stearoylbenzoylmethane or 1-phenyl-3-eicosanedione of formula (7') below:

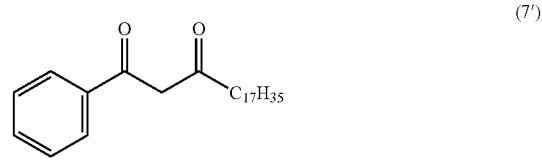

a β-diketone 2,2,7-trimethyl-3,5-octanedione of formula (8') below:

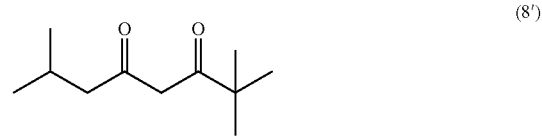

and the acetylacetic acid esters of formula (9') below:

with R=methyl, ethyl, n-propyl, isopropyl, n-butyl, sec-butyl, isobutyl, tert-butyl, isopentyl, n-hexyl, n-octyl, methyl-1 heptyl, n-nonyl, n-decyl and n-dodecyl, A polycondensation catalyst M that is particularly advantageous according to the invention is a complex chosen from the group consisting of the following complexes:
[Zn(R50)$_2$(N,(n-propyl)ethylenediamine)]
[Zn(R50)$_2$(N,(n-propyl)ethylenediamine)$_2$]
[Zn(R50)$_2$(N,N-dimethylethylenediamine)],
[Zn(R50)$_2$(N,N-dimethylethylenediamine)$_2$],
[Zn(R50)$_2$(N,N'-dimethylethylenediamine)],
[Zn(R50)$_2$(N,N'-dimethylethylenediamine)$_2$],
[Zn(R50)$_2$(N,N,N'-trimethylethylenediamine)],
[Zn(R50)$_2$(N,N,N'-trimethylethylenediamine)$_2$],
[Zn(R50)$_2$(N,N'-diisopropylethylenediamine)],
[Zn(R50)$_2$(N,N'-diisopropylethylenediamine)$_2$],
[Zn(R50)$_2$(N,N-diethylethylenediamine)],
[Zn(R50)$_2$(N,N-diethylethylenediamine)$_2$],
[Zn(R50)$_2$(N-methylbutylamine)],
[Zn(R50)$_2$(N-methylbutylamine)$_2$],
[Zn(R50)$_2$(N-dibutylamine)],
[Zn(R50)$_2$(N-dibutylamine)$_2$],
[Zn(R50)$_2$(n-propylamine)],
[Zn(R50)$_2$(n-propylamine)$_2$],
[Zn(R50)$_2$(n-hexylamine)],
[Zn(R50)$_2$(n-hexylamine)$_2$],
[Zn(R50)$_2$(n-heptylamine)],
[Zn(R50)$_2$(n-heptylamine)$_2$],
[Zn(R50)$_2$(n-octylamine)],
[Zn(R50)$_2$(n-octylamine)$_2$],
[Zn(R50)$_2$(n-nonylamine)],
[Zn(R50)$_2$(n-nonylamine)$_2$],
[Zn(R50)$_2$(n-decylamine)],
[Zn(R50)$_2$(n-decylamine)$_2$],

[Zn(R50)₂(n-dodecylamine)],
[Zn(R50)₂(n-dodecylamine)₂],
[Zn(R50)₂(N,N-dimethyl-N-butylamine)],
[Zn(R50)₂(N,N-dimethyl-N-butylamine)₂],
[Zn(R50)₂(N-ethyl-N-butylamine)],
[Zn(R50)₂(N-ethyl-N-butylamine)₂],
[Zn(R50)₂(N,N-diisopropylamine)],
[Zn(R50)₂(N,N-diisopropylamine)₂],
[Zn(R50)₂(N,N-dipropylamine)],
[Zn(R50)₂(N,N-dipropylamine)₂],
[Zn(TMOD)₂(N-(n-propyl)ethylenediamine)],
[Zn(TMOD)₂(N-(n-propyl)ethylenediamine)₂],
[Zn(TMOD)₂(N,N-dimethylethylenediamine)],
[Zn(TMOD)₂(N,N-dimethylethylenediamine)₂],
[Zn(TMOD)₂(N,N'-dimethylethylenediamine)],
[Zn(TMOD)₂(N,N'-dimethylethylenediamine)₂],
[Zn(TMOD)₂(N,N,N'-trimethylethylenediamine)],
[Zn(TMOD)₂(N,N,N'-trimethylethylenediamine)₂],
[Zn(TMOD)₂(N,N'-thisopropylethylenediamine)],
[Zn(TMOD)₂(N,N'-thisopropylethylenediamine)₂],
[Zn(TMOD)₂(N,N-diethylethylenediamine)],
[Zn(TMOD)₂(N,N-diethylethylenediamine)₂],
[Zn(TMOD)₂(N-methylbutylamine)],
[Zn(TMOD)₂(N-methylbutylamine)₂],
[Zn(TMOD)₂(N-dibutylamine)],
[Zn(TMOD)₂(N-dibutylamine)₂],
[Zn(TMOD)₂(n-propylamine)],
[Zn(TMOD)₂(n-propylamine)₂],
[Zn(TMOD)₂(n-hexylamine)],
[Zn(TMOD)₂(n-hexylamine)₂],
[Zn(TMOD)₂(n-heptylamine)],
[Zn(TMOD)₂(n-heptylamine)₂],
[Zn(TMOD)₂(n-octylamine)],
[(Zn(TMOD)₂n-octylamine)₂],
[Zn(TMOD)₂(n-nonylamine)],
[Zn(TMOD)₂(n-nonylamine)₂],
[Zn(TMOD)₂(n-decylamine)],
[Zn(TMOD)₂(n-decylamine)₂],
[Zn(TMOD)₂(n-dodecylamine)],
[Zn(TMOD)₂(n-dodecylamine)₂],
[Zn(TMOD)₂(N,N-dimethyl-N-butylamine)],
[Zn(TMOD)₂(N,N-dimethyl-N-butylamine)₂],
[Zn(TMOD)₂(N-ethyl-N-butylamine)],
[Zn(TMOD)₂(N-ethyl-N-butylamine)₂],
[Zn(TMOD)₂(N,N-diisopropylamine)],
[Zn(TMOD)₂(N,N-diisopropylamine)₂],
[Zn(TMOD)₂(N,N-dipropylamine)],
[Zn(TMOD)₂(N,N-dipropylamine)₂],
[Zn(DPM)₂(N-(n-propyl)ethylenediamine)],
[Zn(DPM)₂(N-(n-propyl)ethylenediamine)₂],
[Zn(DPM)₂(N,N-dimethylethylenediamine)],
[Zn(DPM)₂(N,N-dimethylethylenediamine)₂],
[Zn(DPM)₂(N,N'-dimethylethylenediamine)],
[Zn(DPM)₂(N,N'-dimethylethylenediamine)₂],
[Zn(DPM)₂(N,N,N'-trimethylethylenediamine)],
[Zn(DPM)₂(N,N,N'-trimethylethylenediamine)₂],
[Zn(DPM)₂(N,N'-thisopropylethylenediamine)],
[Zn(DPM)₂(N,N'-diisopropylethylenediamine)₂],
[Zn(DPM)₂(N,N-diethylethylenediamine)],
[Zn(DPM)₂(N,N-diethylethylenediamine)₂],
[Zn(DPM)₂(N-methylbutylamine)],
[Zn(DPM)₂(N-methylbutylamine)₂],
[Zn(DPM)₂(N-dibutylamine)],
[Zn(DPM)₂(N-dibutylamine)₂],
[Zn(DPM)₂(n-propylamine)],
[Zn(DPM)₂(n-propylamine)₂],
[Zn(DPM)₂(n-hexylamine)],
[Zn(DPM)₂(n-hexylamine)₂],
[Zn(DPM)₂(n-heptylamine)],
[Zn(DPM)₂(n-heptylamine)₂],
[Zn(DPM)₂(n-octylamine)],
[Zn(DPM)₂(n-octylamine)₂],
[Zn(DPM)₂(n-nonylamine)],
[Zn(DPM)₂(n-nonylamine)₂],
[Zn(DPM)₂(n-decylamine)],
[Zn(DPM)₂(n-decylamine)₂],
[Zn(DPM)₂(n-dodecylamine)],
[Zn(DPM)₂(n-dodecylamine)₂],
[Zn(DPM)₂(N,N-dimethyl-N-butylamine)],
[Zn(DPM)₂(N,N-dimethyl-N-butylamine)₂],
[Zn(DPM)₂(N-ethyl-N-butylamine)],
[Zn(DPM)₂(N-ethyl-N-butylamine)₂],
[Zn(DPM)₂(N,N-diisopropylamine)],
[Zn(DPM)₂(N,N-diisopropylamine)₂],
[Zn(DPM)₂(N,N-dipropylamine)],
[Zn(DPM)₂(N,N-dipropylamine)₂],
[Zn(acac)₂(N,(n-propyl)ethylenediamine)],
[Zn(acac)₂(N,(n-propyl)ethylenediamine)₂],
[Zn(acac)₂(N,N-dimethylethylenediamine)],
[Zn(acac)₂(N,N-dimethylethylenediamine)₂],
[Zn(acac)₂(N,N'-dimethylethylenediamine)],
[Zn(acac)₂(N,N'-dimethylethylenediamine)₂],
[Zn(acac)₂(N,N,N'-trimethylethylenediamine)],
[Zn(acac)₂(N,N,N'-trimethylethylenediamine)₂],
[Zn(acac)₂(N,N'-diisopropylethylenediamine)],
[Zn(acac)₂(N,N'-diisopropylethylenediamine)₂],
[Zn(acac)₂(N,N-diethylethylenediamine)],
[Zn(acac)₂(N,N-diethylethylenediamine)₂],
[Zn(acac)₂(N-methylbutylamine)],
[Zn(acac)₂(N-methylbutylamine)₂],
[Zn(acac)₂(N-dibutylamine)],
[Zn(acac)₂(N-dibutylamine)₂],
[Zn(acac)₂(n-propylamine)],
[Zn(acac)₂(n-propylamine)₂],
[Zn(acac)₂(n-hexylamine)],
[Zn(acac)₂(n-hexylamine)₂],
[Zn(acac)₂(n-heptylamine)],
[Zn(acac)₂(n-heptylamine)₂],
[Zn(acac)₂(n-octylamine)],
[Zn(acac)₂(n-octylamine)₂],
[Zn(acac)₂(n-nonylamine)],
[Zn(acac)₂(n-nonylamine)₂],
[Zn(acac)₂(n-decylamine)],
[Zn(acac)₂(n-decylamine)₂],
[Zn(acac)₂(n-dodecylamine)],
[Zn(acac)₂(n-dodecylamine)₂],
[Zn(acac)₂(N,N-dimethyl-N-butylamine)],
[Zn(acac)₂(N,N-dimethyl-N-butylamine)₂],
[Zn(acac)₂(N-ethyl-N-butylamine)],
[Zn(acac)₂(N-ethyl-N-butylamine)₂],
[Zn(acac)₂(N,N-diisopropylamine)],
[Zn(acac)₂(N,N-diisopropylamine)₂],
[Zn(acac)₂(N,N-dipropylamine)],
[Zn(acac)₂(N,N-dipropylamine)₂],
[Zn(UDD)₂(N,(n-propyl)ethylenediamine)],
[Zn(UDD)₂(N,(n-propyl)ethylenediamine)₂],
[Zn(UDD)₂(N,N-dimethylethylenediamine)],
[Zn(UDD)₂(N,N-dimethylethylenediamine)₂],
[Zn(UDD)₂(N,N'-dimethylethylenediamine)],
[Zn(UDD)₂(N,N'-dimethylethylenediamine)₂],
[Zn(UDD)₂(N,N,N'-trimethylethylenediamine)],
[Zn(UDD)₂(N,N,N'-trimethylethylenediamine)₂],
[Zn(UDD)₂(N,N'-diisopropylethylenediamine)],
[Zn(UDD)₂(N,N'-thisopropylethylenediamine)₂],

[Zn(UDD)$_2$(N,N-diethylethylenediamine)],
[Zn(UDD)$_2$(N,N-diethylethylenediamine)$_2$],
[Zn(UDD)$_2$(N-methylbutylamine)],
[Zn(UDD)$_2$(N-methylbutylamine)$_2$],
[Zn(UDD)$_2$(N-dibutylamine)],
[Zn(UDD)$_2$(N-dibutylamine)$_2$],
[Zn(UDD)$_2$(n-propylamine)],
[Zn(UDD)$_2$(n-propylamine)$_2$],
[Zn(UDD)$_2$(n-hexylamine)],
[Zn(UDD)$_2$(n-hexylamine)$_2$],
[Zn(UDD)$_2$(n-heptylamine)],
[Zn(UDD)$_2$(n-heptylamine)$_2$],
[Zn(UDD)$_2$(n-octylamine)],
[Zn(UDD)$_2$(n-octylamine)$_2$],
[Zn(UDD)$_2$(n-nonylamine)],
[Zn(UDD)$_2$(n-nonylamine)$_2$],
[Zn(UDD)$_2$(n-decylamine)],
[Zn(UDD)$_2$(n-decylamine)$_2$],
[Zn(UDD)$_2$(n-dodecylamine)],
[Zn(UDD)$_2$(n-dodecylamine)$_2$],
[Zn(UDD)$_2$(N,N-dimethyl-N-butylamine)],
[Zn(UDD)$_2$(N,N-dimethyl-N-butylamine)$_2$],
[Zn(UDD)$_2$(N-ethyl-N-butylamine)],
[Zn(UDD)$_2$(N-ethyl-N-butylamine)$_2$],
[Zn(UDD)$_2$(N,N-diisopropylamine)],
[Zn(UDD)$_2$(N,N-diisopropylamine)$_2$],
[Zn(UDD)$_2$(N,N-dipropylamine)],
[Zn(UDD)$_2$(N,N-dipropylamine)$_2$], and with the ligand R50 which is the β-diketonate or the enolate anion of the following β-dicarbonyl compound=β-diketone stearoylbenzoylmethane of formula (7') below:

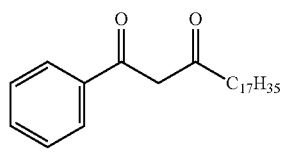

(7')

with the ligand acac which is the β-diketonate or the enolate anion of the following β-dicarbonyl compound=2,4-pentanedione with the ligand UDD which is the β-diketonate or the enolate anion of the following β-dicarbonyl compound=2,4-undecanedione with the ligand DPM which is the β-diketonate or the enolate anion of the following β-dicarbonyl compound=2,2,6,6-tetramethyl-3,5-heptanedione and with the ligand TMOD which is the β-diketonate or the enolate anion of the following β-dicarbonyl compound=2,2,7-trimethyl-3,5-octanedione of formula (8') below:

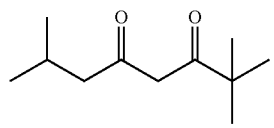

(8')

and mixtures thereof.

The amount of polycondensation catalysts M according to the invention is between 0.01% and 10% by weight relative to the total mass of composition Z, preferably between 0.1% and 5%, whether it is a one-pack or two-pack preparation.

According to a preferred embodiment, the composition according to the invention is free of tin-based catalyst, for instance tin dicarboxylates. This is made possible due to the good catalytic activity of the polycondensation catalyst M according to the invention.

Preferably, the organosilicon compound A' is a polyorganosiloxane comprising:

(i) at least two siloxyl units of formula (4') below:

(4')

in which:
the symbols $R^1$, which may be identical or different, represent $C_1$ to $C_{30}$ monovalent hydrocarbon-based radicals,
the symbols Z, which may be identical or different, each represent a hydrolyzable and condensable group or a hydroxyl group and are preferably chosen from the group consisting of groups of the following types: hydroxyl, alkoxy, alkoxy-alkylene-oxy, amino, amido, acylamino, aminoxy, iminoxy, ketiminoxy, acyloxy, iminoxy, ketiminoxy and enoxy and even more preferentially Z is a hydroxyl group,
a is equal to 0, 1 or 2, b is equal to 1, 2 or 3, the sum a+b is equal to 1, 2 or 3, (ii) and optionally one or more siloxyl units of formula (5') below:

(5')

in which:
the symbols R, which may be identical or different, represent $C_1$ to $C_{30}$ monovalent hydrocarbon-based radicals optionally substituted with one or more halogen atoms or with amino, ether, ester, epoxy, mercapto or cyano groups, and
the symbol c is equal to 0, 1, 2 or 3.

Preferably, the organosilicon compound A' according to the invention will bear at least two groups chosen from the group consisting of groups such as hydroxyl, alkoxy, alkoxy-alkylene-oxy, amino, amido, acylamino, aminoxy, iminoxy, ketiminoxy, acyloxy and enoxy.

Another important aspect for a composition that is cross-linkable via condensation reactions is the working time (pot life), that is to say the time during which the composition may be used after mixing without curing. This time must be long enough to allow it to be used, but short enough to obtain a cured coat at the latest a few minutes or a few hours after it has been deposited onto the support to be treated. In addition, the components that are reactive in the presence of the catalyst must confer, on the catalyzed mixture, a spreading time which does not vary as a function of the storage time.

Thus, when the organosilicon compound A' is a polyorganosiloxane bearing at least two hydroxyl groups (of silanol type ≡SiOH), it has been discovered, surprisingly and unexpectedly, that when it is used in a composition according to the invention which comprises as catalyst a zinc complex bearing carboxylate and amine ligands according to the invention, it is then possible to increase or decrease the "working time" (or pot life) by simply varying the molar mass of the organosilicon compound A' within a specific range. Thus, by varying the weight-average molar masses ($M_w$) of the organosilicon compound A' within a range of values greater than at least twice the entanglement molar mass $M_e$, it is then possible to modify the "working time" (or pot life) without deteriorating the mechanical properties (for example the shore A hardness) of the elastomer obtained after crosslinking Without being bound by theory, the formation of points of entanglement starting from a certain length of macromolecular chains for each type of polyorganosiloxane is thus possible starting from a certain entanglement molar mass of the polymer identified by the symbol "$M_e$". Thus, the "critical molar mass" noted $M_c$ is defined as being equal to about twice the entanglement molar mass $M_e$. Above the critical molar mass $M_c$, it was thus possible to control the "working time" (or pot life) of the silicone composition before crosslinking.

As a guide and depending on the type of group present in the polyorganosiloxane bearing at least two hydroxyl groups of silanol type ≡SiOH, the entanglement molar mass $M_e$ is between 15 000 and 30 000 g/mol.

Thus, an advantageous embodiment consists in using an organosilicon compound A' which is a polyorganosiloxane bearing at least two hydroxyl groups of silanol type ≡SiOH whose weight-average molar mass $M_w$ is greater than at least twice the entanglement molar mass $M_e$. Controlling, by virtue of the choice of the weight-average molar mass Mw of the organosilicon compound A, the presence or absence of entanglement of the polyorganosiloxane chains bearing at least two hydroxyl groups of silanol type ≡SiOH makes it possible simultaneously to control:
the mechanical properties of the elastomer obtained after crosslinking of the composition according to the invention and especially the shore A hardness, and
the "working time" during which the composition is manipulable before crosslinking.

Controlling the entanglement of the chains of the polyorganosiloxane bearing at least two hydroxyl groups of silanol type ≡SiOH will be performed by carefully selecting the weight-average molar mass $M_w$ of the polymer so that its molar mass is at least twice as large as the entanglement molar mass, i.e. it will be greater than the critical molar mass $M_c$ of this polymer.

Preferably, the organosilicon compound A' is a polyorganosiloxane of general formula (6'):

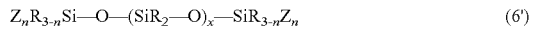
(6')

in which:
the symbols Z, which may be identical or different, each represent a hydrolyzable and condensable group or a hydroxyl group and are preferably chosen from the group consisting of groups of the following types: hydroxyl, alkoxy, alkoxy-alkylene-oxy, amino, amido, acylamino, aminoxy, iminoxy, ketiminoxy, acyloxy and enoxy,
the symbols R, which may be identical or different, represent $C_1$ to $C_{30}$ monovalent hydrocarbon-based radicals optionally substituted with one or more halogen atoms or with amino, ether, ester, epoxy, mercapto or cyano groups,
the symbol n is equal to 1, 2 or 3, preferably equal to 2 or 3 and and when Z is a hydroxyl group, then n=1,
the symbol x is between 200 and 10000, preferably between 200 and 1000 and even more preferentially between 250 and 600.

In formulae (4'), (5') and (6'), the symbols $R^1$ and R are preferably:
alkyl radicals containing from 1 to 20 carbon atoms optionally substituted with: 1 or more aryl or cycloalkyl groups, with one or more halogen atoms or with amino, ether, ester, epoxy, mercapto, cyano or (poly)glycol groups. Examples that may be mentioned include methyl, ethyl, propyl, isopropyl, butyl, pentyl, hexyl, 2-ethylhexyl, octyl, decyl, 3,3,3-trifluoropropyl, 4,4,4-trifluorobutyl and 4,4,4,3,3-pentafluorobutyl radicals,
cycloalkyl and halocycloalkyl radicals containing from 5 to 13 carbon atoms, such as cyclopentyl, cyclohexyl, methylcyclohexyl, propylcyclohexyl, 2,3-difluorocyclobutyl and 3,4-difluoro-5-methylcycloheptyl radicals,
mononuclear aryl and haloaryl radicals containing from 6 to 13 carbon atoms, such as phenyl, tolyl, xylyl, chlorophenyl, dichlorophenyl or trichlorophenyl radicals, or
alkenyl radicals containing from 2 to 8 carbon atoms, such as vinyl, allyl or 2-butenyl radicals.

The dynamic viscosity at 25° C. of the organosilicon compound A is generally between 50 and 5 000 000 mPa·s and preferably between 100 and 1 000 000 mPa·s. It is pointed out that the viscosity values in the present specification are the dynamic viscosity values measured at 25° C. using a Brookfield viscometer.

In the particular case where the organosilicon compound A' is a polyorganosiloxane of general formula (6') with symbols Z of hydroxyl type, then the symbol n will preferably be equal to 1. In this case, it is preferred to use α-omega dihydroxy polyorganosiloxanes which are generally oils whose viscosity usually ranges between 100 mPa·s at 25° C. and 1 000 000 mPa·s at 25° C., preferably from 800 mPa·s to 500 000 mPa·s at 25° C. When it is desired to control the service life of the bath, it will be arranged such that the choice of the organosilicon compound A' is made as a function of the weight-average molar mass $M_w$ ($M_w$ greater than at least twice the entanglement molar mass $M_e$). For the intended application and when the compound is a polydimethylsiloxane ending with silanol functions (≡SiOH), its viscosity will preferably be greater than 750 mPa·s and even more preferentially between 1000 mPa·s and 20 000 mPa·s.

When the organosilicon compound A' is a polyorganosiloxane, it is advantageous to use those of which at least 60% of the radicals R and $R^1$ (in formulae 4 and 5) or of the radical R (in formula 6) are methyl radicals, the other radicals generally being phenyl and/or vinyl radicals.

According to the invention, the symbols Z each represent a hydroxyl group or a hydrolyzable and condensable group which are preferably chosen from the group consisting of groups of the following types: alkoxy, alkoxy-alkylene-oxy, amino, amido, acylamino, aminoxy, iminoxy, ketiminoxy, acyloxy and enoxy, When the organosilicon compound A' contains hydrolyzable and condensable groups Z according to the invention and is a polyorganosiloxane, it is usually described as a functionalized polymer and corresponds to a form that is stable in the absence of moisture which may be used in a one-pack composition and may thus be packaged in a hermetically sealed jar, cartridge or drum, which will be opened by the operator during use for application to the support to be treated. When the organosilicon group A' contains groups Z of hydroxyl type, they may be functionalized in situ in the one-pack compositions, via a functionalization catalyst such as lithium hydroxide, so as to be able to store them and package them in hermetically sealed cartridges.

As examples of hydrolyzable and condensable groups Z of alkoxy type, mention may be made of groups containing from 1 to 8 carbon atoms, such as methoxy, ethoxy, n-propoxy, isopropoxy, n-butoxy, isobutoxy, sec-butoxy, tert-butoxy, 2-methoxyethoxy, hexyloxy or octyloxy groups.

As an example of hydrolyzable and condensable groups Z of alkoxy-alkylene-oxy type, mention may be made of the methoxy-ethylene-oxy group.

As examples of hydrolyzable and condensable groups Z of amino type, mention may be made of methylamino, dimethylamino, ethylamino, diethylamino, n-butylamino, sec-butylamino or cyclohexylamino groups.

As an example of hydrolyzable and condensable groups Z of amido type, mention may be made of the N-methylacetamido group.

As an example of hydrolyzable and condensable groups Z of acylamino type, mention may be made of the benzoylamino group.

As examples of hydrolyzable and condensable aminoxy groups Z, mention may be made of dimethylaminoxy, diethylaminoxy, dioctylaminoxy or diphenylaminoxy groups.

As examples of hydrolyzable and condensable groups Z of iminoxy and in particular ketiminoxy type, mention may be made of groups derived from the following oximes: acetophenone oxime, acetone oxime, benzophenone oxime, methylethylketoxime, diisopropylketoxime or methylisobutylketoxime.

As an example of hydrolyzable and condensable groups Z of enoxy type, mention may be made of the 2-propenoxy group.

According to a preferred embodiment, the crosslinking agent B' is a silicon compound, each molecule of which comprises at least three hydrolyzable and condensable groups Y and said crosslinking agent B' having the formula (7') below:

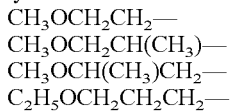  (7')

in which formula:
the symbol R' is a monovalent hydrocarbon-based radical comprising from 1 to 30 carbon atoms,
the symbol Y is an alkoxy, alkoxy-alkylene-oxy, amino, amido, acylamino, aminoxy, iminoxy, ketiminoxy, acyloxy or enoxy group and preferably Y is an alkoxy, acyloxy, enoxy, ketiminoxy or oxime group,
the symbol a=3 or 4.

Examples of groups Y are the same as those mentioned above when the symbol Z is a hydrolyzable and condensable group, i.e. other than a hydroxyl group.

As examples of crosslinking agent B', mention may be made of the alkoxysilanes of general formula (8) below, and the products of partial hydrolysis of this silane:

  (8)

in which:
the symbols $R^2$, which may be identical or different, represent alkyl radicals containing from 1 to 8 carbon atoms, such as methyl, ethyl, propyl, butyl, pentyl, 2-ethylhexyl radicals or $C_3$-$C_6$ oxyalkylene radicals,
the symbol $R^3$ represents a saturated or unsaturated, linear or branched aliphatic hydrocarbon-based group, a saturated or unsaturated and/or aromatic, monocyclic or polycyclic carbocyclic group,
and k is equal to 0, 1 or 2.

As examples of $C_3$-$C_6$ alkoxyalkylene radicals, mention may be made of the following radicals:
CH$_3$OCH$_2$CH$_2$—
CH$_3$OCH$_2$CH(CH$_3$)—
CH$_3$OCH(CH$_3$)CH$_2$—
C$_2$H$_5$OCH$_2$CH$_2$CH$_2$—

The symbol $R^3$ preferably represents a $C_1$-$C_{10}$ hydrocarbon-based radical that encompasses:
$C_1$-$C_{10}$ alkyl radicals such as methyl, ethyl, propyl, butyl, pentyl, 2-ethylhexyl, octyl or decyl radicals;
vinyl and allyl radicals, and
$C_5$-$C_8$ cycloalkyl radicals such as phenyl, tolyl and xylyl radicals.

These crosslinking agents B' are products that are available on the silicones market; furthermore, their use in room-temperature curing compositions is known; it is featured especially in French patents FR-A-1 126 411, FR-A-1 179 969, FR-A-1 189 216, FR-A-1 198 749, FR-A-1 248 826, FR-A-1 314 649, FR-A-1 423 477, FR-A-1 432 799 and FR-A-2 067 636.

Among the crosslinking agents B', preference is more particularly given to alkyltrialkoxysilanes, alkyl silicates and polyalkyl silicates, in which the organic radicals are alkyl radicals containing from 1 to 4 carbon atoms.

As other examples of crosslinking agents B' that may be used, mention is more particularly made of polyethyl silicate, poly(n-propyl silicate) and the following silanes: propyltrimethoxysilane, methyltrimethoxysilane, ethyltrimethoxysilane, vinyltriethoxysilane, vinyltrimethoxysilane, methyltriethoxysilane, propyltriethoxysilane, tetramethoxysilane, tetraethoxysilane, tetrapropoxysilane, tetrabutoxysilane 1,2-bis(trimethoxysilyl)ethane, 1,2-bis(triethoxysilyl)ethane, tetraisopropoxysilane, phenyltriethoxysilane, methyltris(methylethylketoximo) silane, 3-cyanopropyltrimethoxy silane, 3-cyanopropyltriethoxysilane, 3-(glycidyloxy)propyltriethoxysilane, vinyltris(methylethylketoximo)silane, tetrakis(methylethylketoximo)silane, acyloxysilanes such as vinyltriacetoxysilane, methyltriacetoxysilane or ethyltriacetoxysilane or alternatively those having the following formulae:

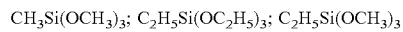

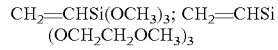

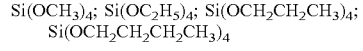

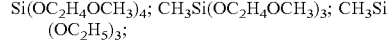

In general, from 0.1 to 60 parts by weight of crosslinking agent B' are used per 100 parts by weight of organosilicon compound A'. Preferably, from 1 to 15 parts by weight are used per 100 parts by weight of organosilicon compound A'.

According to a particularly advantageous embodiment, the composition Z comprises:
(i) at least one organosilicon compound A' comprising at least two identical or different hydrolyzable and condensable groups, or at least two silanol functions ≡SiOH,
(ii) at least one crosslinking agent B',
(iii) a catalytically effective amount of at least one polycondensation catalyst M which is a zinc complex comprising in its structure two types of ligand: carboxylate and amine.

(iv) at least one compound L' which exudes at the surface of the antifouling coat when the elastomer network is formed, thus improving the "antifouling" effect, (v) optionally at least one adhesion promoter E', (vi) optionally at least one siliceous mineral, organic and/or non-siliceous filler F', (vii) optionally at least one pigment, a coloring base or a coloring agent H', and (viii) optionally at least one solvent K'.

Examples of compounds L' that exude at the surface of the antifouling coat when the elastomer network is formed, thus improving the "antifouling" effect, are, for example, compounds a), b), c), d), e), f) and g) below:

Compounds a) are polyorganosiloxane oils corresponding to the general formula (II) below:

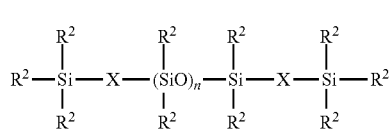

in which:

R² is an alkyl, aryl or alkenyl radical, methyl and phenyl radicals are preferred (a particularly preferred example being a methylphenylpolysiloxane oil as described, for example, in U.S. Pat. No. 4,025,693), X is an oxygen atom or a divalent hydrocarbon-based group of 1 to 8 carbon atoms, and n is a number defined so as to obtain a diorganopolysiloxane with a viscosity of between 10 and $1 \times 10^6$ mm²/s at 25° C.

These polyorganosiloxane oils may optionally be grafted and comprise acrylic, amide, amine, carbonyl, carboxylic, carboxylate, thiol, thioether, urea, quaternary ammonium, fluoroalkyl or perfluoroalkyl groups. Grafted or block polydimethylsiloxane oils comprising at least one polyether block (with, for example, polyethylene glycol and/or polypropylene glycol groups) may also be used.

Compound b) is a hydrocarbon-based liquid compound: for example a polyolefin such as an ethylene/propylene copolymer and in particular a low molecular weight polyisobutene (up to 5000 g/mol and preferably between 300 and 500 g/mol).

Compound c) is an organic liquid compound chosen from polydienes, polyesters, polyisocyanates, polyurethanes, polyepoxides, fluoroalkyls, fluoro ethers, lubricant oils (see, for example, patent FR-A-2 375 305) and plasticizers (for example fatty acid esters that may be optionally substituted with heteroatoms or phosphoric acid esters or halohydrocarbon compounds). Polyethylene glycols, polypropylene glycols or castor oil may also be used and they also afford anti-running properties during the application of the composition.

The compounds d) are liquid paraffins and waxy masses such as petrolatum (JP-A-83/013 673).

Compound e) is a thermoplastic polymer such as PVC.

Compound f) is a vinyl chloride/vinyl acetate copolymer (Kokai JP-A-79/026 826).

The compounds g) are cationic, anionic, nonionic or amphoteric surfactants (JP-A-85/258 271).

(1) one or more hydrolyzable groups bonded to the silicon atom, and (2) one or more organic groups substituted with radicals comprising a nitrogen atom or chosen from the group of (meth)acrylate, epoxy and alkenyl radicals, and more preferably still from the group constituted by the following compounds, taken alone or as a mixture:

vinyltrimethoxysilane (VTMO);
3-glycidoxypropyltrimethoxysilane (GLYMO);
methacryloxypropyltrimethoxysilane (MEMO);
$[H_2N(CH_2)_3]Si(OCH_2CH_2CH_3)_3$,
$[H_2N(CH_2)_3]Si(OCH_3)_3$
$[H_2N(CH_2)_3]Si(OC_2H_5)_3$
$[H_2N(CH_2)_4]Si(OCH_3)_3$
$[H_2NCH_2CH(CH_3)CH_2CH_2]SiCH_3(OCH_3)_2$
$[H_2NCH_2]Si(OCH_3)_3$
$[n-C_4H_9-HN-CH_2]Si(OCH_3)_3$
$[H_2N(CH_2)_2NH(CH_2)_3]Si(OCH_3)_3$
$[H_2N(CH_2)_2NH(CH_2)_3]Si(OCH2CH_2OCH_3)_3$
$[CH_3NH(CH_2)_2NH(CH_2)_3]Si(OCH_3)_3$
$[H(NHCH_2CH_2)_2NH(CH_2)_3]Si(OCH_3)_3$

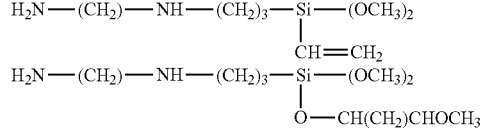

or polyorganosiloxane oligomers containing such organic groups in a content greater than 20%.

As examples of siliceous, organic and/or non-siliceous mineral F', mention may be made of very finely divided products whose mean particle diameter is less than 0.1 µm. Among these fillers are fumed silicas and precipitated silicas; their BET specific surface area is generally greater than 40 m²/g. These fillers may also be in the form of more coarsely divided products with an average particle diameter greater than 0.1 µm. As examples of such fillers, mention may be made of ground quartz, diatomaceous silicas, calcium carbonate, calcined clay, rutile-type titanium oxide, iron, zinc, chromium, zirconium or magnesium oxides, the various forms of alumina (hydrated or unhydrated), boron nitride, lithopone, barium metaborate, barium sulfate and glass microbeads; their specific surface area is generally less than 30 m²/g. These fillers may have been surface-modified by treatment with the various organosilicon compounds customarily employed for this purpose. Thus, these organosilicon compounds may be organochlorosilanes, diorganocyclopolysiloxanes, hexaorganodisiloxanes, hexaorganodisilazanes or diorganocyclopolysilazanes (French patents FR-A-1 126 884, FR-A-1 136 885 and FR-A-1 236 505, and British patent GB-A-1 024 234). The treated fillers contain, in most cases, from 3 to 30% of their weight of organosilicon compounds. The fillers may consist of a mixture of several types of fillers of different particle size; thus, for example, they may be constituted of 30 to 70% of finely divided silicas with a BET specific surface area greater than 40 m²/g and of 70 to 30% of more coarsely divided silicas with a specific surface area less than 30 m²/g. The purpose of introducing fillers is to give good mechanical and rheological properties to the elastomers that result from the curing of the compositions according to the invention.

The compositions according to the invention may also advantageously comprise at least one silicone resin (J'). These silicone resins are branched organopolysiloxane polymers which are well known and which are available commercially. They have, per molecule, at least two different units chosen from those of formula $R'''_3SiO_{1/2}$ (M unit), $R'''_2SiO_{2/2}$ (D unit), $R'''SiO_{3/2}$ (T unit) and $SiO_{4/2}$ (Q unit)

with at least one of the units being a T or Q unit. The R'" radicals are identical or different and are chosen from linear or branched alkyl radicals or vinyl, phenyl or 3,3,3-trifluoropropyl radicals. Preferably, the alkyl radicals have from 1 to 6 carbon atoms inclusive. More particularly, mention may be made, as examples of alkyl R radicals, of methyl, ethyl, isopropyl, tert-butyl and n-hexyl radicals. These resins are preferably hydroxylated and, in this case, have a weight content of hydroxyl group of between 5 and 500 meq./100 g. Examples of resins that may be mentioned include MQ resins, MDQ resins, TD resins and MDT resins.

The composition Z according to the invention may also comprise a pigment, a coloring base or a coloring agent H'. Examples of pigments H' are, as a guide: red iron oxide, zinc oxide, carbon black, graphite, yellow iron oxide, white titanium oxide, chromium oxide, cobalt oxide, litharge, ultramarine and molybdenum red and yellow, or organic pigments that are known and widely used in the field of aquatic paints. Other common auxiliary agents and additives (thixotropic agents, anti-running agents, etc.) may be incorporated into the composition according to the invention.

Besides the main constituents, the composition Z may comprise nonreactive linear polyorganosiloxane polymers (G'), which may be introduced with the intention of acting on the physical characteristics of the compositions in accordance with the invention and/or on the mechanical properties of the elastomers resulting from the curing of these compositions.

These nonreactive linear polyorganosiloxane polymers (G') are well known; they more especially comprise: $\alpha,\omega$-bis(triorganosiloxy)diorganopolysiloxane polymers with viscosities of at least 10 mPa·s at 25° C., formed essentially from diorganosiloxy units and from at most 1% of monoorganosiloxy and/or siloxy units, the organic radicals bonded to the silicon atoms being chosen from methyl, vinyl and phenyl radicals, 60% at least of these organic radicals being methyl radicals and 10% at most being vinyl radicals. The viscosity of these polymers can reach several tens of millions of mPa·s at 25° C.; they therefore include oils with a fluid to viscous appearance and soft to hard gums. They are prepared according to the usual techniques described more precisely in French patents FR-A-978 058, FR-A-1 025 150, FR-A-1 108 764 and FR-A-1 370 884. Use is preferably made of a, w-bis(trimethylsiloxy)dimethylpolysiloxane oils with a viscosity ranging from 10 mPa·s to 1000 mPa·s at 25° C. These polymers, which act as plasticizers, may be introduced in a proportion of at most 70 parts by weight, preferably of 5 to 20 parts by weight, per 100 parts by weight of the organosilicon compound A'.

Examples of solvents K' are: aliphatic, cycloaliphatic or aromatic hydrocarbon-based derivatives such as white spirit, cyclohexane, toluene, octamethyltrisiloxane, xylene and ester solvents such as methoxypropyl acetate, n-butyl acetate and 2-ethoxyethyl acetate, acetone, acetonitrile, and also mixtures thereof. The amount of solvent is determined according to the application or the support to be treated so as to obtain a paint of acceptable viscosity.

Other customary auxiliary agents and additives may be incorporated into the composition according to the invention; these are chosen as a function of the applications in which said compositions are used.

The compositions according to the invention may be:
  one-pack or RTV-1, i.e. packaged in a single airtight packaging, and stable on storage in the absence of moisture, or
  two-pack or RTV-2, i.e. packaged in two packages and the components of the composition are separated into two separate fractions, which cure once they are combined the presence of atmospheric moisture.

One-pack bases are described in detail, for example, in patents EP 141 685, EP 147 323, EP 102 268, EP 21 859, FR 2 121 289 and FR 2 121 631, cited as reference.

Two-pack bases are described in detail, for example, in patents EP 118 325, EP 117 772, EP 10 478, EP 50 358, EP 184 966, U.S. Pat. Nos. 3,801,572 and 3,888,815 cited as reference.

An RTV-2 two-pack composition, which is a precursor of composition Z according to the invention, may be in two separate airtight packages P1 and P2, characterized in that:
  the package P1 comprises:
    a catalytically effective amount of at least one polycondensation catalyst M' according to the invention and as defined above, and
    at least one crosslinking agent B' and preferably as defined above, and
  the package P2 does not contain said polycondensation catalyst M and said crosslinking agent B' and comprises:
    per 100 parts by weight of at least one organosilicon compound A' which is preferably a $\alpha,\omega$-bis(dimethylhydroxysilyl)polydimethylsiloxane whose dynamic viscosity at 25° C. is between 500 mPa·s and 100 000 mPa·s and preferably between 1000 mPa·s and 10000 mPa·s, and
    from 0 to 10 part(s) by weight of water.

One of the advantages of these novel RTV-2 compositions according to the invention over conventional polycondensation RTV-2 products using dialkyltin dicarboxylate catalysts is that it is no longer necessary to add water to the part P2 since the catalyst according to the invention does not need to be activated, thus simplifying the formulation.

Any material that is used in an aquatic environment and that is subject to fouling may be a support (1) for the present invention. Possible supports are boat construction materials, such as steel, aluminum, wood, resin-impregnated glass fibers and any other composite material. Materials used for pipes, such as concrete, plastics, steel, iron and other metals, may also be coated. Tanks containing water, including swimming pools, are subject to fouling. The materials used for manufacturing tanks are identical or similar to those used for manufacturing pipes.

When an antifouling coat (4) (or top coat) according to the invention is used, it may be combined with an adhesion-promoting coat (3) (or tie coat) of diverse and varied nature. For example, it may be made of polyurethane, of optionally chlorinated natural or synthetic rubber, such as chloroprene and neoprene, or of butyral/silicone rubber (Kokai JP-A-78/137 231, JP-A-78/137 233 and JP-A-78/137 234). According to another approach, for example described in patent U.S. Pat. No. 5,449,553, a tie coat is described and is prepared from a composition that is curable in atmospheric moisture comprising a tin-based polycondensation catalyst, a crosslinking agent such as ethyl silicate and a copolymer derived from the product of reaction of a silylhydroxy-terminated organopolysiloxane with a polymerizable monomer such as a styrene or a conjugated diolefin, for instance 1,3-butadiene. According to another example described in patent EP-1 670 866, a tie coat is formed from a composition comprising:
  (i) from 0 to 60% by wet weight of pigments and fillers; and
  (ii) the remainder being a binder-based phase comprising:
    from 1% to 90% by wet weight of one or more polysiloxanes bearing amine functions, from 1% to 90% by wet weight of one or more polysiloxanes bearing epoxy functions, and
from 0 to 20% by wet weight of an adhesion promoter chosen from the group consisting of polysiloxanes bearing hydroxyl functions, polysiloxanes bearing hydroxyalkyl functions and polysiloxanes bearing $C_1$-$C_4$ alkoxy functions.

The invention also relates to a process for applying an antifouling coat (4) to a support (1) intended to be used in aquatic applications, comprising the following steps:

a) at least one primer coat (2) comprising at least one anticorrosion product is optionally deposited on said support (1),
b) an adhesion-promoting coat (3) is deposited on said primer coat (2) or on said support (1) when the primer coat (2) is absent,
c) said adhesion-promoting coat (3) is cured,
d) an antifouling coat (4) is deposited on said adhesion-promoting coat (3), and
e) said antifouling coat (4) is cured on contact with atmospheric moisture, and
said process being characterized in that the antifouling coat (4) and optionally the adhesion-promoting coat (3) are prepared from the composition Z according to the invention and as defined above.

The thickness of the coats applied may vary and films from 12 to 1000 microns in thickness (on condition that the deposit is uniform) have given good results. The typical thickness of the various coats is about 50 μm for the primer, 150 μm for the tie coat and 150 μm for the top coat. Needless to say, a person skilled in the art will know how to adapt the thickness of the various coats as a function of the desired result.

The final subject of the invention concerns a use of the composition Z according to the invention and as defined above for forming, after curing on contact with atmospheric moisture, an antifouling coat (4) on an article so as to protect it against the adhesion of aquatic organisms.

Thus, the composition Z according to the invention may be used as a "fouling-release coating" paint, which, after curing by means of atmospheric moisture or by adding water, give the surface of the treated support ultra-smooth properties, with low friction forces and low surface energies. It is these physical properties which prevent the fouling from adhering.

Other advantages and features of the present invention will appear on reading the following examples that are given by way of illustration and that are in no way limiting.

EXAMPLES

Example 1

Preparation of the [Zn(β-diketonate)$_2$(amine)$_n$]Complexes

The [Zn(β-diketonate)$_2$] complexes are either commercially available or prepared according to the methods described in international patent application WO 2009/106 718.

General procedure for preparing the [Zn(β-diketonate)$_2$(amine)$_n$] complexes: A zinc diketonate is diluted or dissolved in an alkane, ether or aromatic solvent, and the amine is added in pure or diluted form, stoichiometrically, as a function of the desired complex. The complexation is slightly exothermic. The solvent is evaporated off to give the expected complex.

Depending on the β-diketonates, the nature of the amines and the amounts of amine added, the following complexes are obtained:

[Zn(R50)$_2$(N,(n-propyl)ethylenediamine)],
[Zn(R50)$_2$(N,(n-propyl)ethylenediamine)$_2$],
[Zn(R50)$_2$(N,N-dimethylethylenediamine)],
[Zn(R50)$_2$(N,N-dimethylethylenediamine)$_2$],
[Zn(R50)$_2$(N,N'-dimethylethylenediamine)],
[Zn(R50)$_2$(N,N'-dimethylethylenediamine)$_2$],
[Zn(R50)$_2$(N,N,N'-trimethylethylenediamine)],
[Zn(R50)$_2$(N,N,N'-trimethylethylenediamine)$_2$],
[Zn(R50)$_2$(N,N'-diisopropylethylenediamine)],
[Zn(R50)$_2$(N,N'-diisopropylethylenediamine)$_2$],
[Zn(R50)$_2$(N,N-diethylethylenediamine)],
[Zn(R50)$_2$(N,N-diethylethylenediamine)$_2$],
[Zn(R50)$_2$(N-methylbutylamine)],
[Zn(R50)$_2$(N-methylbutylamine)$_2$],
[Zn(R50)$_2$(N-dibutylamine)],
[Zn(R50)$_2$(N-dibutylamine)$_2$],
[Zn(R50)$_2$(n-propylamine)],
[Zn(R50)$_2$(n-propylamine)$_2$],
[Zn(R50)$_2$(n-hexylamine)],
[Zn(R50)$_2$(n-hexylamine)$_2$],
[Zn(R50)$_2$(n-heptylamine)],
[Zn(R50)$_2$(n-heptylamine)$_2$],
[Zn(R50)$_2$(n-octylamine)],
[Zn(R50)$_2$(n-octylamine)$_2$],
[Zn(R50)$_2$(n-nonylamine)],
[Zn(R50)$_2$(n-nonylamine)$_2$],
[Zn(R50)$_2$(n-decylamine)],
[Zn(R50)$_2$(n-decylamine)$_2$],
[Zn(R50)$_2$(n-dodecylamine)],
[Zn(R50)$_2$(n-dodecylamine)$_2$],
[Zn(R50)$_2$(N,N-dimethyl-N-butylamine)],
[Zn(R50)$_2$(N,N-dimethyl-N-butylamine)$_2$],
[Zn(R50)$_2$(N-ethyl-N-butylamine)],
[Zn(R50)$_2$(N-ethyl-N-butylamine)$_2$],
[Zn(R50)$_2$(N,N-diisopropylamine)],
[Zn(R50)$_2$(N,N-diisopropylamine)$_2$],
[Zn(R50)$_2$(N,N-dipropylamine)],
[Zn(R50)$_2$(N,N-dipropylamine)$_2$],
[Zn(TMOD)$_2$(N-(n-propyl)ethylenediamine)],
[Zn(TMOD)$_2$(N-(n-propyl)ethylenediamine)$_2$],
[Zn(TMOD)$_2$(N,N-dimethylethylenediamine)],
[Zn(TMOD)$_2$(N,N-dimethylethylenediamine)$_2$],
[Zn(TMOD)$_2$(N,N'-dimethylethylenediamine)],
[Zn(TMOD)$_2$(N,N'-dimethylethylenediamine)$_2$],
[Zn(TMOD)$_2$(N,N,N'-trimethylethylenediamine)],
[Zn(TMOD)$_2$(N,N,N'-trimethylethylenediamine)$_2$],
[Zn(TMOD)$_2$(N,N'-thisopropylethylenediamine)],
[Zn(TMOD)$_2$(N,N'-thisopropylethylenediamine)$_2$],
[Zn(TMOD)$_2$(N,N-diethylethylenediamine)],
[Zn(TMOD)$_2$(N,N-diethylethylenediamine)$_2$],
[Zn(TMOD)$_2$(N-methylbutylamine)],
[Zn(TMOD)$_2$(N-methylbutylamine)$_2$],
[Zn(TMOD)$_2$(N-dibutylamine)],
[Zn(TMOD)$_2$(N-dibutylamine)$_2$],
[Zn(TMOD)$_2$(n-propylamine)],
[Zn(TMOD)$_2$(n-propylamine)$_2$],
[Zn(TMOD)$_2$(n-hexylamine)],
[Zn(TMOD)$_2$(n-hexylamine)$_2$],
[Zn(TMOD)$_2$(n-heptylamine)],
[Zn(TMOD)$_2$(n-heptylamine)$_2$],
[Zn(TMOD)$_2$(n-octylamine)],
[(Zn(TMOD)$_2$ n-octylamine)$_2$],
[Zn(TMOD)$_2$(n-nonylamine)],
[Zn(TMOD)$_2$(n-nonylamine)$_2$],

[Zn(TMOD)$_2$(n-decylamine)],
[Zn(TMOD)$_2$(n-decylamine)$_2$],
[Zn(TMOD)$_2$(n-dodecylamine)],
[Zn(TMOD)$_2$(n-dodecylamine)$_2$],
[Zn(TMOD)$_2$(N,N-dimethyl-N-butylamine)],
[Zn(TMOD)$_2$(N,N-dimethyl-N-butylamine)$_2$],
[Zn(TMOD)$_2$(N-ethyl-N-butylamine)],
[Zn(TMOD)$_2$(N-ethyl-N-butylamine)$_2$],
[Zn(TMOD)$_2$(N,N-diisopropylamine)],
[Zn(TMOD)$_2$(N,N-diisopropylamine)$_2$],
[Zn(TMOD)$_2$(N,N-dipropylamine)],
[Zn(TMOD)$_2$(N,N-dipropylamine)$_2$],
[Zn(DPM)$_2$(N-(n-propyl)ethylenediamine)],
[Zn(DPM)$_2$(N-(n-propyl)ethylenediamine)$_2$],
[Zn(DPM)$_2$(N,N-dimethylethylenediamine)],
[Zn(DPM)$_2$(N,N-dimethylethylenediamine)$_2$],
[Zn(DPM)$_2$(N,N'-dimethylethylenediamine)],
[Zn(DPM)$_2$(N,N'-dimethylethylenediamine)$_2$],
[Zn(DPM)$_2$(N,N,N'-trimethylethylenediamine)],
[Zn(DPM)$_2$(N,N,N'-trimethylethylenediamine)$_2$],
[Zn(DPM)$_2$(N,N'-thisopropylethylenediamine)],
[Zn(DPM)$_2$(N,N'-thisopropylethylenediamine)$_2$],
[Zn(DPM)$_2$(N,N-diethylethylenediamine)],
[Zn(DPM)$_2$(N,N-diethylethylenediamine)$_2$],
[Zn(DPM)$_2$(N-methylbutylamine)],
[Zn(DPM)$_2$(N-methylbutylamine)$_2$],
[Zn(DPM)$_2$(N-dibutylamine)],
[Zn(DPM)$_2$(N-dibutylamine)$_2$],
[Zn(DPM)$_2$(n-propylamine)],
[Zn(DPM)$_2$(n-propylamine)$_2$],
[Zn(DPM)$_2$(n-hexylamine)],
[Zn(DPM)$_2$(n-hexylamine)$_2$],
[Zn(DPM)$_2$(n-heptylamine)],
[Zn(DPM)$_2$(n-heptylamine)$_2$],
[Zn(DPM)$_2$(n-octylamine)],
[Zn(DPM)$_2$(n-octylamine)$_2$],
[Zn(DPM)$_2$(n-nonylamine)],
[Zn(DPM)$_2$(n-nonylamine)$_2$],
[Zn(DPM)$_2$(n-decylamine)],
[Zn(DPM)$_2$(n-decylamine)$_2$],
[Zn(DPM)$_2$(n-dodecylamine)],
[Zn(DPM)$_2$(n-dodecylamine)$_2$],
[Zn(DPM)$_2$(N,N-dimethyl-N-butylamine)],
[Zn(DPM)$_2$(N,N-dimethyl-N-butylamine)$_2$],
[Zn(DPM)$_2$(N-ethyl-N-butylamine)],
[Zn(DPM)$_2$(N-ethyl-N-butylamine)$_2$],
[Zn(DPM)$_2$(N,N-diisopropylamine)],
[Zn(DPM)$_2$(N,N-diisopropylamine)$_2$],
[Zn(DPM)$_2$(N,N-dipropylamine)],
[Zn(DPM)$_2$(N,N-dipropylamine)$_2$],
[Zn(acac)$_2$(N,(n-propyl)ethylenediamine)],
[Zn(acac)$_2$(N,(n-propyl)ethylenediamine)$_2$],
[Zn(acac)$_2$(N,N-dimethylethylenediamine)],
[Zn(acac)$_2$(N,N-dimethylethylenediamine)$_2$],
[Zn(acac)$_2$(N,N'-dimethylethylenediamine)],
[Zn(acac)$_2$(N,N'-dimethylethylenediamine)$_2$],
[Zn(acac)$_2$(N,N,N'-trimethylethylenediamine)],
[Zn(acac)$_2$(N,N,N'-trimethylethylenediamine)$_2$],
[Zn(acac)$_2$(N,N'-diisopropylethylenediamine)],
[Zn(acac)$_2$(N,N'-diisopropylethylenediamine)$_2$],
[Zn(acac)$_2$(N,N-diethylethylenediamine)],
[Zn(acac)$_2$(N,N-diethylethylenediamine)$_2$],
[Zn(acac)$_2$(N-methylbutylamine)],
[Zn(acac)$_2$(N-methylbutylamine)$_2$],
[Zn(acac)$_2$(N-dibutylamine)],
[Zn(acac)$_2$(N-dibutylamine)$_2$],
[Zn(acac)$_2$(n-propylamine)],
[Zn(acac)$_2$(n-propylamine)$_2$],
[Zn(acac)$_2$(n-hexylamine)],
[Zn(acac)$_2$(n-hexylamine)$_2$],
[Zn(acac)$_2$(n-heptylamine)],
[Zn(acac)$_2$(n-heptylamine)$_2$],
[Zn(acac)$_2$(n-octylamine)],
[Zn(acac)$_2$(n-octylamine)$_2$],
[Zn(acac)$_2$(n-nonylamine)],
[Zn(acac)$_2$(n-nonylamine)$_2$],
[Zn(acac)$_2$(n-decylamine)],
[Zn(acac)$_2$(n-decylamine)$_2$],
[Zn(acac)$_2$(n-dodecylamine)],
[Zn(acac)$_2$(n-dodecylamine)$_2$],
[Zn(acac)$_2$(N,N-dimethyl-N-butylamine)],
[Zn(acac)$_2$(N,N-dimethyl-N-butylamine)$_2$],
[Zn(acac)$_2$(N-ethyl-N-butylamine)],
[Zn(acac)$_2$(N-ethyl-N-butylamine)$_2$],
[Zn(acac)$_2$(N,N-diisopropylamine)],
[Zn(acac)$_2$(N,N-diisopropylamine)$_2$],
[Zn(acac)$_2$(N,N-dipropylamine)],
[Zn(acac)$_2$(N,N-dipropylamine)$_2$]
[Zn(UDD)$_2$(N,(n-propyl)ethylenediamine)],
[Zn(UDD)$_2$(N,(n-propyl)ethylenediamine)$_2$]
[Zn(UDD)$_2$(N,N-dimethylethylenediamine)],
[Zn(UDD)$_2$(N,N-dimethylethylenediamine)$_2$],
[Zn(UDD)$_2$(N,N'-dimethylethylenediamine)],
[Zn(UDD)$_2$(N,N'-dimethylethylenediamine)$_2$],
[Zn(UDD)$_2$(N,N,N'-trimethylethylenediamine)],
[Zn(UDD)$_2$(N,N,N'-trimethylethylenediamine)$_2$],
[Zn(UDD)$_2$(N,N'-diisopropylethylenediamine)],
[Zn(UDD)$_2$(N,N'-diisopropylethylenediamine)$_2$],
[Zn(UDD)$_2$(N,N-diethylethylenediamine)],
[Zn(UDD)$_2$(N,N-diethylethylenediamine)$_2$],
[Zn(UDD)$_2$(N-methylbutylamine)],
[Zn(UDD)$_2$(N-methylbutylamine)$_2$],
[Zn(UDD)$_2$(N-dibutylamine)],
[Zn(UDD)$_2$(N-dibutylamine)$_2$],
[Zn(UDD)$_2$(n-propylamine)],
[Zn(UDD)$_2$(n-propylamine)$_2$],
[Zn(UDD)$_2$(n-hexylamine)],
[Zn(UDD)$_2$(n-hexylamine)$_2$],
[Zn(UDD)$_2$(n-heptylamine)],
[Zn(UDD)$_2$(n-heptylamine)$_2$],
[Zn(UDD)$_2$(n-octylamine)],
[Zn(UDD)$_2$(n-octylamine)$_2$],
[Zn(UDD)$_2$(n-nonylamine)],
[Zn(UDD)$_2$(n-nonylamine)$_2$],
[Zn(UDD)$_2$(n-decylamine)],
[Zn(UDD)$_2$(n-decylamine)$_2$],
[Zn(UDD)$_2$(n-dodecylamine)],
[Zn(UDD)$_2$(n-dodecylamine)$_2$],
[Zn(UDD)$_2$(N,N-dimethyl-N-butylamine)],
[Zn(UDD)$_2$(N,N-dimethyl-N-butylamine)$_2$],
[Zn(UDD)$_2$(N-ethyl-N-butylamine)],
[Zn(UDD)$_2$(N-ethyl-N-butylamine)$_2$],
[Zn(UDD)$_2$(N,N-diisopropylamine)],
[Zn(UDD)$_2$(N,N-diisopropylamine)$_2$],
[Zn(UDD)$_2$(N,N-dipropylamine)],
[Zn(UDD)$_2$(N,N-dipropylamine)$_2$], and
with the ligand R50 which is the β-diketonate or the enolate anion of the following β-dicarbonyl compound=β-diketone stearoylbenzoylmethane of formula (7') below:

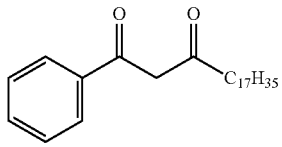

(7')

with the ligand acac which is the β-diketonate or the enolate anion of the following β-dicarbonyl compound=2,4-pentanedione with the ligand UDD which is the β-diketonate or the enolate anion of the following β-dicarbonyl compound=2,4-undecanedione with the ligand DPM which is the β-diketonate or the enolate anion of the following β-dicarbonyl compound=2,2,6,6-tetramethyl-3,5-heptanedione and with the ligand TMOD which is the β-diketonate or the enolate anion of the following β-dicarbonyl compound=2,2,7-trimethyl-3,5-octanedione of formula (8') below:

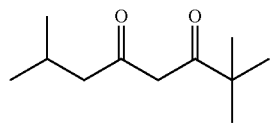

(8')

Example with zinc acetylacetonate hydrate: to a suspension in 30 ml of diisopropyl ether of 9.89 g of [Zn(acac)$_2$].H$_2$O containing 23.14% by weight of Zn(35 mM) are added 1.01 eq. of dibutylamine (35.35 mM, 4.57 g at 99%). The homogeneous medium is stirred for 1 hour and then evaporated to give 13.7 g of the [Zn(acac)$_2$(dibutylamine)] complex in the form of a sparingly viscous liquid.

1H NMR (CDCl3): 5.27 (2H, s), 2.61 (4H, t), 1.93 (12H, s), 1.47 (4H, quintuplet), 1.26 (4H, sextuplet), 0.87 (6H, t).

Example with Benzoylstearoylmethane (R50):
β-diketone stearoylbenzoylmethane of formula (7') below:

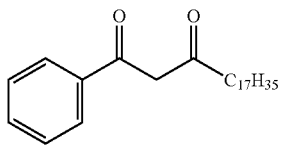

(7')

To a suspension of 98.1 g of benzoylstearoylmethane (R50) in 260 g of toluene are added 54 g of a solution of sodium methoxide at 25% in methanol at 20° C., to give a pale yellow homogeneous medium. After 30 minutes, 34.8 g of a solution of zinc chloride at 50% in methanol are added and, after 1 hour, 16.5 g of dibutylamine are added to the suspension. After 30 minutes, the sodium chloride is filtered off and the solution is evaporated at 60° C. and 2 mbar to give 120.7 g of the expected complex (100% yield) as a pale yellow liquid which crystallizes over time (b.p. about 40° C.). Depending on whether one or two equivalents of amine were added, the following complexes were prepared:

[Zn(R50)$_2$(N-dibutylamine)],
[Zn(R50)$_2$(N-dibutylamine)$_2$],
All the structures were confirmed by $^1$H NMR analysis.

Example 2

Application in an RTV-1 One-Pack System

In RTV-1, the slurry used is prepared as follows: 16 g of a solution of lithium hydroxide at 2% by weight in methanol, then, after 5 mM, 400 g of AE55 fumed silica are added, with stirring, to a mixture of 3464 g of an α,ω-dihydroxylated oil with a viscosity of 20 000 centipoises and of 120 g of vinyltrimethoxysilane. The mixture is devolatilized under vacuum then stored in a moisture-free environment.

For each test, the catalyst tested is mixed with 50 g of this slurry, and the catalytic potential is then evaluated in 3 ways (see the tables of results below):

the skin-over time (SOT), time at the end of which surface crosslinking is observed, on a 2 mm film;

the persistence of a tacky feel at 48 h;

the hardness (Shore A hardness) of a 6 mm thick bead under controlled conditions (23° C. and 50% relative humidity) and over increasing times (2, 3, 4, 7 and 14 days). The high temperature stability is also evaluated by hardness measurements carried out on the bead after 7 days at room temperature followed by 7 days at 100° C.

NB: The Shore hardness was measured on a 6 mm bead. In the tables of results the symbol ">" corresponds to the hardness values measured on the upper part of the bead and the symbol "<" corresponds to the hardness values measured on the lower part of the bead that is less exposed to the ambient air than the upper part.

Amines tested:
N,N'-dimethylethylenediamine=DMED
N-(n-propyl)ethylenediamine=PrED
ligand TMOD=β-diketonate or enolate anion of the following β-dicarbonyl compound=2,2,7-trimethyl-3,5-octanedione of formula (8') below:

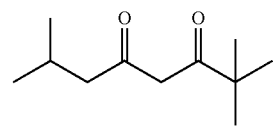

(8')

TABLE 1

| Test | Catalyst tested | amount of catalyst per 50 g of slurry | Skin-over time (min-utes) | Tacky feel after 48 h | Shore A hardness over 6 mm | | | |
|---|---|---|---|---|---|---|---|---|
| | | | | | 2 d | | 4 d | |
| | | | | | > | < | > | < |
| 1 | [Zn(TMOD)$_2$] | 2.1 mM | 90 | yes | 7 | 9 | 18 | 20 |
| 2 | [Zn(TMOD)$_2$(DMED)] | 2.1 mM | 25 | no | 23 | 16 | 29 | 25 |
| 3 | [Zn(TMOD)$_2$(PrED)] | 2.1 mM | 45 | no | 19 | 15 | 28 | 22 |

The catalysts according to the invention show better hardnesses and no longer have the problems associated with the "tacky feel" of the corresponding non-amino catalyst.

Example 3

RTV-2 Two-Pack Composition—Polyethyl Silicate Crosslinking Agent (a1): hydroxylated polydimethylsiloxane oil with a viscosity of 14 000 mPa·s at 25° C. and blocked at each of the chain ends with a siloxyl unit $M^{OH}$ having the following formula: $(CH_3)_2(OH)SiO_{1/2}$, (b1): fumed silica with a BET specific surface area of 200 m²/g, treated with hexamethyldisilazane (HMDZ), dispersed in a mixture of hydroxylated polydimethylsiloxane oil (a1) and of a polydimethylsiloxane oil blocked at each of the chain ends with a siloxyl unit M having the following formula $(CH_3)_3SiO_{1/2}$;

(b2): ground quartz with a mean particle diameter of 10 μm;

(d1): catalyst tested;

(e): polyethyl silicate.

The activity of the catalyst according to the invention [Zn(TMOD)$_2$ (N,N-dimethylethylenediamine)] is evaluated relative to the corresponding but non-amino zinc complex [Zn(TMOD)$_2$].

TMOD is the β-diketonate or the enolate anion of the following β-dicarbonyl compound=2,2,7-trimethyl-3,5-octanedione of formula (8') below:

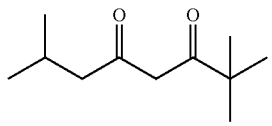

To do this, a slurry is prepared from the following constituents:

20.4 g of α,ω-dihydroxylated oil (a1),
61.3 g of a filler (b1), and
18.3 g of a filler (b2), to which are added 1.5 g of polyethyl silicate (crosslinking agent) per 100 g of slurry and x grams (y mmol) of the catalyst to be tested (d1).

For the zinc catalysts (according to the invention or for the comparative), the amounts tested are added to 1.5 ml of the solvent methyl tert-butyl ether (MTBE).

TABLE 2

Constituents of the RTV-2 compositions tested (polyethyl silicate crosslinking agent).

| Ingredients | Examples according to the invention (grams) |
|---|---|
| (a1) | 20.4 |
| (b1) | 61.3 |
| (b2) | 18.3 |
| (e) | 1.5 g per 100 g |
| (d1) | 2.66 mmol per 100 g of slurry |

In RTV-2, the tests are performed directly on a mixture consisting of ingredients (a1), (b1), (b2) and (e), to which is added and mixed the catalyst to be tested (d1). The working time or pot life is first measured (time after which the viscosity of the mixture prevents its use, i.e. the time required for the formation of a gel), and, from another mixture, a slug 6 mm thick is then cast and, after curing, the Shore A hardnesses (above and below) of a demolded slug 6 mm thick are measured under regulated conditions (23° C. and 50% relative humidity) and over increasing times. In the tables of results, the symbol ">" corresponds to the hardness values measured on the upper part of the slug and the symbol "<" corresponds to the hardness values measured on the lower part of the slug that is less exposed to the ambient air than the upper part. Measurement of the Shore A hardness, noted SAH=measurements performed according to the indications of standard ASTM-D 2240. The working time or pot life is the time beyond which the viscosity of the mixture prevents its use.

TABLE 3

RTV-2 tests—polyethyl silicate crosslinking agent

| Tests | Catalysts tested (d1) | Working time (min) | Shore A hardness over 6 mm | | | |
|---|---|---|---|---|---|---|
| | | | 1 day | | 3 days | |
| | | | > | < | > | < |
| 4 | [Zn(TMOD)$_2$)] | 18 | 16* | 17 | 20* | 22 |
| 5 | [Zn(TMOD)$_2$(N,N-dimethylethylenediamine)] | 42 | 19 | 18 | 24 | 23 |

For test 1, the symbol "*" indicates that the feel remains tacky even after 3 days.

Example 3

Preparation of an Antifouling Top Coat According to the Invention

Formulation 1: all the amounts are expressed in parts by weight.

80 parts α,ω-dihydroxylated polydimethylsiloxane oil with a viscosity of 3500 centipoises 10 parts ethyl silicate 5 parts methylphenylpolysiloxane oil sold by the company Bluestar Silicones under the name Rhodorsil Oil 510V100®

2 parts methylphenylpolysiloxane oil sold by the company Bluestar Silicones under the name Rhodorsil Oil 550®

3 parts Aerosil 200® silica sold by the company Degussa 1 part castor oil x parts catalysts to be tested 0.7 part Pigment Bayferrox 130F® sold by the company Bayer 0.1 part Dispersant Disperbyk 140® sold by the company Byk 20 parts xylene A sanded and degreased steel metal plate is coated with an epoxy primer coat (prepared from SigmaShield 610® sold by the company Sigmakalon) about 50 μm thick. After 72 hours of drying at room temperature, an adhesion-promoting tie coat (prepared from SigmaGlide 790® sold by the company Sigmakalon) about 150 microns thick is applied. After 48 hours of drying at room temperature, a coat of about 150 μm of the top coat prepared according to formulation 1 described above is applied.

After drying for 48 hours at room temperature, the plate is immersed in a marine medium (in seawater) and is examined after 12 and 23 weeks of immersion.

After washing abundantly with water, the antifouling evaluation is 100, which indicates the total absence of organisms on the coated plate.

The invention claimed is:

1. An article with antifouling properties for use in an aquatic application, comprising:
   a) a support
   b) at least one adhesion-promoting coat deposited on said support, and
   c) at least one antifouling coat deposited on said adhesion-promoting coat,
   wherein said antifouling coat is obtained after deposition and curing on contact with atmospheric moisture a composition Z comprising:
      (i) at least one organosilicon compound A' comprising at least two identical or different hydrolyzable and condensable groups, or at least two silanol functions $\equiv$SiOH,
      (ii) at least one crosslinking agent B', and
      (iii) a catalytically effective amount of at least one polycondensation catalyst M which is a zinc complex comprising in its structure a first type of ligand that is a β-diketonate and a second type of ligand that is an amine.

2. The article as claimed in claim 1, comprising:
   a) a support,
   b) at least one primer coat deposited on said support comprising at least one anticorrosion product,
   c) at least one adhesion-promoting coat deposited on said primer coat, and
   d) at least one antifouling coat deposited on said adhesion-promoting coat,
   wherein said antifouling coat is obtained after deposition and curing on contact with atmospheric moisture a composition Z comprising:
      (i) at least one organosilicon compound A' comprising at least two identical or different hydrolyzable and condensable groups, or at least two silanol functions $\equiv$SiOH,
      (ii) at least one crosslinking agent B', and
      (iii) a catalytically effective amount of at least one polycondensation catalyst M which is a zinc complex comprising in its structure a first type of ligand that is a β-diketonate and a second type of ligand that is an amine.

3. The article as claimed in claim 1, wherein composition Z comprises:
   (i) at least one organosilicon compound A' comprising at least two identical or different hydrolyzable and condensable groups, or at least two silanol functions $\equiv$SiOH,
   (ii) at least one crosslinking agent B', and
   (iii) a catalytically effective amount of at least one polycondensation catalyst M which is a complex of formula (1') below:

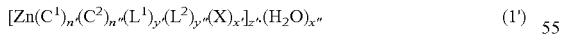

(1')

in which:
   the symbols $C^1$ and $C^2$ are identical or different ligands chosen from the group of β-diketonates,
   the symbols n' and n" are integers equal to 0, 1 or 2 with the condition that the sum n'+n"=2,
   the symbols $L^1$ and $L^2$ are identical or different ligands chosen from the group of amines,
   the symbols y' and y" represent the number of amine ligands and are integers equal to 0, 1 or 2 with the condition that the sum y'+y"=1 or 2,
   the symbol X is a ligand other than $C^1$, $C^2$, $L^1$ and $L^2$,
   the symbol x'≥0,
   the symbol x"≥0, and
   the symbol z' is an integer greater than or equal to 1.

4. The article as claimed in claim 3, in which the ligands of amine type $L^1$ and $L^2$ are chosen from the group consisting of the following amines:
   dimethylethylenediamine, trimethylethylenediamine, diisopropylethylenediamine, n-butylamine, n-propylamine, n-heptylamine, n-octylamine, n-nonylamine, tert-butylamine, isopropylamine, 2-ethylhexylamine, decylamine, dodecylamine, which may be linear or branched, N-methyl-N-butylamine, N,N-dipropylamine, N,N-diisopropylamine, N-ethyl-N-butylamine, N,N-dibutylamine, N,N-dimethyl-N-butylamine, di(n-octyl)amine, N-n-propylethylenediamine, N,N'-dimethylethylenediamine, N,N,N',N'-tetramethylethylenediamine, 3-aminopropyltrimethoxysilane and 3-aminopropylmethyldiethoxysilane.

5. The article as claimed in claim 3, in which the ligands $C^1$ and when the ligand $C^2$ is present are β-diketonates or enolate anions of a β-dicarbonyl compound of formula (10') below:

(10')

in which:
   $R^1$ and $R^3$, independently of each other, represent a $C_1$ to $C_{30}$ hydrocarbon-based radical, a $C_6$ to $C_{30}$ hydrocarbon-based radical comprising an aromatic ring or a radical —$OR^4$ with $R^4$ which represents a $C_1$ to $C_{30}$ hydrocarbon-based radical,
   $R^2$ is a hydrogen or a $C_1$ to $C_{30}$ hydrocarbon-based radical, with
   $R^1$ and $R^2$ may be linked via a radical, to form a ring, and
   $R^2$ may be linked to $R^1$ or $R^3$ via a radical, to form a ring.

6. The article as claimed in claim 3, wherein the symbol X is a neutral ligand other than an amine,
   the symbol x'=0, 1, 2, 3 or 4,
   the symbol x"=0, 1, 2, 3 or 4, and
   the symbol z'=1 or 2.

7. The article as claimed in claim 1, wherein the polycondensation catalyst M is a complex of formula (2') below:

(2')

in which:
   the symbols $C^1$ and $C^2$ are identical or different ligands chosen from the group of β-diketonates,
   the symbols n' and n" represent the number of β-diketonate ligands and are integers equal to 0, 1 or 2 with the condition that the sum n'+n"=2,
   the symbols $L^1$ and $L^2$ are identical or different ligands chosen from the group of amines,
   the symbols y' and y" represent the number of amine ligands and are integers equal to 0, 1 or 2 with the condition that the sum y'+y"=1 or 2, and
   the symbol z' is an integer greater than or equal to 1.

8. The article as claimed in claim 1, wherein the polycondensation catalyst M is a complex of formula (3') below:

(3')

in which:
   the symbol $C^1$ is a ligand chosen from the group of β-diketonates,
   the symbol $L^1$ is a ligand chosen from the group of amines,
   the symbol y' is a number equal to 1 or 2,
   the symbol r≥1, and
   the symbol z' is an integer greater than or equal to 1.

9. The article as claimed in claim 1, in which the ligands of amine type $L^1$ or $L^2$ are chosen from the group consisting of primary monoamines of alkylamine type containing in total from 1 to 40 carbon atoms for the alkyl radical, secondary monoamines of dialkylamine type containing in total from 2 to 40 carbon atoms for the alkyl radicals, tertiary monoamines of trialkylamine type containing in total from 3 to 60 carbon atoms for the alkyl radicals, alkyl diamines containing in total from 1 to 40 carbon atoms for the alkyl radicals and amino silanes.

10. The article as claimed in claim 9, wherein the ligands $L^1$ and $L^2$ are chosen from the group consisting of secondary monoamines of dialkylamine type containing in total from 2 to 20 carbon atoms and primary monoamines of alkylamine type containing in total from 1 to 40 carbon atoms for the alkyl radical.

11. The article as claimed in claim 1, wherein the polycondensation catalyst M is a complex of formula (3') below:

$$[(Zn(C^1)_2)_r.(L^1)_{y'}]_{z'} \quad (3')$$

in which:
the symbol r≥1,
the symbol z' is an integer greater than or equal to 1,
the symbol $L^1$ is a ligand chosen from the group consisting of the following compounds:
N,N-dimethylethylenediamine, N,N'-dimethylethylenediamine, N-(n-propyl)ethylenediamine, N,N,N'-trimethylethylenediamine, N,N'-diisopropylethylenediamine, N,N-diethylethylenediamine, N,N'-diethylethylenediamine, N,N,N',N'-tetramethylethylenediamine, N-methylbutylamine, N-dibutylamine, n-propylamine, n-hexylamine, n-heptylamine, n-octylamine, n-nonylamine, n-decylamine, n-dodecylamine, tert-butylamine, isopropylamine, 2-ethylhexylamine, bis(2-ethylhexyl)amine, diisononylamine, N,N-dipropylamine, N,N-dihexylamine, N,N-diheptylamine, N,N-dioctylamine, N,N-diisopropylamine, N-ethyl-N-butylamine, N,N-dimethyl-N-butylamine, 3-aminopropyltrimethoxysilane and 3-aminopropylmethyldiethoxysilane, and
the symbol $C^1$ is chosen from the group consisting of the β-diketonates or the enolate anions of the following β-dicarbonyl compounds:
2,4-pentanedione; 2,4-hexanedione; 2,4-heptanedione; 2,4-octanedione; 2,4-nonanedione; 2,4-decanedione; 2,4-undecanedione; 2,4-dodecanedione; 3,5-heptanedione; 3-ethyl-2,4-pentanedione; 5-methyl-2,4-hexanedione; 2,4-octanedione; 3,5-octanedione; 5,5-dimethyl-2,4-hexanedione; 6-methyl-2,4-heptanedione; 2,2-dimethyl-3,5-nonanedione; 2,6-dimethyl-3,5-heptanedione; 2-acetylcyclohexanone (Cy-acac); 2,2,6,6-tetramethyl-3,5-heptanedione (t-Bu-acac); 1,1,1,5,5,5-hexafluoro-2,4-pentanedione (F-acac); benzoylacetone; dibenzoylmethane; 3-methyl-2,4-pentadione; 3-acetyl-2-pentan-2-one; 3-acetyl-2-hexanone; 3-acetyl-2-heptanone; 3-acetyl-5-methyl-2-hexanone; stearoylbenzoylmethane; 4-t-butyl-4'-methoxydibenzoylmethane; 4,4'-dimethoxydibenzoylmethane, 4,4'-di-tert-butyldibenzoylmethane; 2,2,6,6-tetramethyl-3,5-heptanedione, ethyl acetoacetate and isopropyl acetoacetate
a β-diketone stearoylbenzoylmethane or 1-phenyl-3-eicosanedione of formula (7') below:

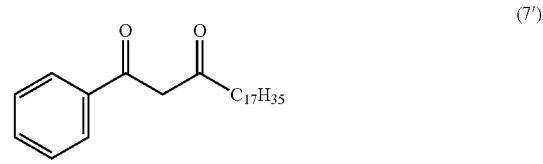

a β-diketone 2,2,7-trimethyl-3,5-octanedione of formula (8') below:

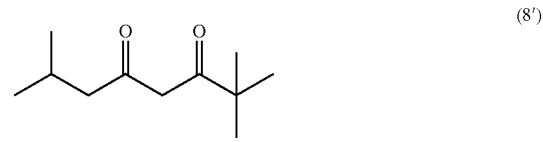

and the acetylacetic acid esters of formula (9') below:

with R=methyl, ethyl, n-propyl, isopropyl, n-butyl, sec-butyl, isobutyl, tert-butyl, isopentyl, n-hexyl, n-octyl, methyl-1 heptyl, n-nonyl, n-decyl and n-dodecyl.

12. The article as claimed in claim 11, wherein the symbol r=1, 2, 3 or 4 and the symbol z'=1 or 2.

13. The article as claimed in claim 1, in which the polycondensation catalyst M is obtained:
a) by reacting per 1 mol of at least one zinc complex of formula [Zn β-diketonate)$_2$] or of a mixture of two different zinc complexes of formula [Zn (β-diketonate)$_2$] $X^1$ mol of amine or a mixture of amine with $X^1$≤2.5 molar equivalents relative to the zinc, optionally in the presence of a solvent, so as to obtain a reaction product comprising:
x mol of a zinc complex A which is a complex of formula [(Zn(β-diketonate)$_2$)$_r$(amine)]
y mol of a zinc complex B which is a complex of formula [(Zn(β-diketonate)$_2$)$_r$(amine)$_2$]$_{z'}$,
with x≥0, y≥0, the symbol r≥1, and the symbol z' is an integer greater than or equal to 1,
optionally $X^3$ mol of the complex [Zn (β-diketonate)$_2$], and
optionally $X^4$ mol of residual unreacted amine, and
b) after removal of the residual amine and optionally of the solvent, the polycondensation catalyst(s) M are recovered in the form of at least one zinc complex A, at least one zinc complex B or a mixture of zinc complex A and of zinc complex B, with optionally a residual amount of $X^3$ mol of the complex [Zn (β-diketonate)$_2$], and
the symbols $X^1$, $X^3$ and $X^4$ are numbers and the sum $x+y+X^3=1$.

14. The article as claimed in claim 1, in which the organosilicon compound A' is a polyorganosiloxane comprising:
(i) at least two siloxyl units of formula (4') below:

in which:
the symbols $R^1$, which may be identical or different, represent $C_1$ to $C_{30}$ monovalent hydrocarbon-based radicals,
the symbols Z, which may be identical or different, each represent a hydrolyzable and condensable group or a hydroxyl,
a is equal to 0, 1 or 2, b is equal to 1, 2 or 3, the sum a+b is equal to 1, 2 or 3,
(ii) and optionally one or more siloxyl units of formula (5') below:

 (5')

in which:
the symbols R, which may be identical or different, represent $C_1$ to $C_{30}$ monovalent hydrocarbon-based radicals optionally substituted with one or more halogen atoms or with amino, ether, ester, epoxy, mercapto or cyano groups, and
the symbol c is equal to 0, 1, 2 or 3.

15. The article as claimed in claim 1, in which the crosslinking agent B' is a silicon compound, each molecule of which comprises at least three hydrolyzable and condensable groups Y and said crosslinking agent B' having formula (7') below:

 (7')

in which formula:
the symbol R' is a monovalent hydrocarbon-based radical comprising from 1 to 30 carbon atoms,
the symbol Y is an alkoxy, alkoxy-alkylene-oxy, amino, amido, acylamino, aminoxy, iminoxy, ketiminoxy, acyloxy or enoxy group,
the symbol a=3 or 4.

16. The article as claimed in claim 1, wherein the composition Z comprises:
(i) at least one organosilicon compound A' comprising at least two identical or different hydrolyzable and condensable groups, or at least two silanol functions ≡SiOH,
(ii) at least one crosslinking agent B',
(iii) a catalytically effective amount of at least one polycondensation catalyst M which is a zinc complex comprising in its structure two types of ligand: β-diketonate and amine,
(iv) at least one compound L' which exudes at the surface of the antifouling coat when the elastomer network is formed, thus improving "antifouling" effect,
(v) optionally at least one adhesion promoter E',
(vi) optionally at least one siliceous mineral, organic and/or non-siliceous filler F',
(vii) optionally at least one pigment, a coloring base or a coloring agent H', and
(viii) optionally at least one solvent K'.

17. A process for applying an antifouling coat to a support intended to be used in an aquatic application, comprising:
a) at least one primer coat comprising at least one anti-corrosion product is optionally deposited on said support,
b) an adhesion-promoting coat is deposited on said primer coat or on said support when the primer coat is absent,
c) said adhesion-promoting coat is cured,
d) an antifouling coat is deposited on said adhesion-promoting coat, and
e) said antifouling coat is cured on contact with atmospheric moisture,
said process being characterized in that the antifouling coat and optionally the adhesion-promoting coat are prepared from the composition Z comprising (i) at least one organosilicon compound A' comprising at least two identical or different hydrolyzable and condensable groups, or at least two silanol functions ≡SiOH,
(ii) at least one crosslinking agent B', and
(iii) a catalytically effective amount of at least one polycondensation catalyst M which is a zinc complex comprising in its structure a first type of ligand that is a β-diketonate and a second type of ligand that is an amine.

18. A composition Z comprising (i) at least one organosilicon compound A' comprising at least two identical or different hydrolyzable and condensable groups, or at least two silanol functions ≡SiOH,
(ii) at least one crosslinking agent B', and
(iii) a catalytically effective amount of at least one polycondensation catalyst M which is a zinc complex comprising in its structure a first type of ligand that is a β-diketonate and a second type of ligand that is an amine, which can form, after curing on contact with atmospheric moisture, an antifouling coat on an article so as to protect said article against adhesion of one or more aquatic organisms.

* * * * *